United States Patent
Atarius et al.

(10) Patent No.: US 7,443,826 B1
(45) Date of Patent: Oct. 28, 2008

(54) METHOD AND APPARATUS FOR AUTOMATIC FREQUENCY CONTROL IN A CDMA RECEIVER

(75) Inventors: Roozbeh Atarius, Cary, NC (US);
Gregory Bottomley, Cary, NC (US);
Paul W. Dent, Pittsboro, NC (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 862 days.

(21) Appl. No.: 09/678,907

(22) Filed: Oct. 4, 2000

(51) Int. Cl.
*H04B 7/216* (2006.01)

(52) U.S. Cl. .................. 370/342; 370/441; 375/349

(58) Field of Classification Search .............. 370/335, 370/342, 208, 347, 441, 479; 375/206, 130, 375/340, 205, 147, 148, 344, 345, 346, 347, 375/348
See application file for complete search history.

(56) References Cited

U.S. PATENT DOCUMENTS

| | | |
|---|---|---|
| 5,151,919 A | 9/1992 | Dent |
| 5,331,666 A | 7/1994 | Dent |
| 5,335,250 A | 8/1994 | Dent et al. |
| 5,361,276 A * | 11/1994 | Subramanian .............. 375/150 |
| 5,490,165 A * | 2/1996 | Blakeney et al. ............ 370/335 |
| 5,557,645 A | 9/1996 | Dent |
| 5,572,552 A | 11/1996 | Dent et al. |
| 5,594,754 A | 1/1997 | Dohi et al. |
| 5,619,533 A | 4/1997 | Dent |
| 5,659,573 A | 8/1997 | Bruckert et al. |
| 5,675,616 A | 10/1997 | Hulbert et al. |
| 5,691,974 A | 11/1997 | Zehavi et al. |
| 5,740,208 A * | 4/1998 | Hulbert et al. .............. 375/346 |
| 5,764,687 A * | 6/1998 | Easton ........................ 375/147 |
| 5,767,738 A * | 6/1998 | Brown et al. ................. 329/304 |
| 5,930,288 A * | 7/1999 | Eberhardt ................... 375/148 |
| 5,950,131 A * | 9/1999 | Vilmur ........................ 455/434 |
| 6,067,292 A * | 5/2000 | Huang et al. ................ 370/342 |
| 6,137,843 A * | 10/2000 | Chennakeshu et al. ...... 375/340 |

(Continued)

FOREIGN PATENT DOCUMENTS

DE        19618916 A1    11/1997

(Continued)

OTHER PUBLICATIONS

European Search Report mailed on Jul. 4, 2005 in connection with counterpart European Patent Application No. 01974324.4.

*Primary Examiner*—Chi H. Pham
*Assistant Examiner*—Kevin Mew
(74) *Attorney, Agent, or Firm*—Potomac Patent Group PLLC

(57) ABSTRACT

Code division multiple access signals received through at least one multipath propagation channel are processed to produce at least one relative frequency error estimate. This involves receiving and processing the signals using a local frequency reference oscillator to obtain representative complex numerical samples for processing. The complex numerical samples are correlated with shifts of a locally generated despreading code and a number of complex channel estimates are produced, each corresponding to a different delayed ray of the at least one multipath propagation channel. A frequency error estimate is computed for each ray based on successive values of a respective one of the channel estimates, and a weighted summation of the frequency error estimates is performed to provide at least one relative frequency error estimate.

52 Claims, 19 Drawing Sheets

U.S. PATENT DOCUMENTS

| | | | | |
|---|---|---|---|---|
| 6,278,725 B1 * | 8/2001 | Rouphael et al. | ............. | 375/148 |
| 6,304,563 B1 * | 10/2001 | Blessent et al. | ............. | 370/335 |
| 6,304,620 B1 * | 10/2001 | Rouphael | .................... | 375/344 |
| 6,356,538 B1 * | 3/2002 | Li | ............................. | 370/311 |
| 6,459,888 B1 * | 10/2002 | Clark | ......................... | 455/266 |
| 6,608,858 B1 * | 8/2003 | Sih et al. | .................... | 375/147 |
| 6,625,197 B1 * | 9/2003 | Lundby et al. | .............. | 375/130 |
| 6,731,911 B1 * | 5/2004 | Hirata et al. | ................. | 455/71 |
| 6,816,540 B2 * | 11/2004 | Hirata | ........................ | 375/147 |
| 2001/0004373 A1 * | 6/2001 | Hirata | ........................ | 375/130 |
| 2003/0087617 A1 * | 5/2003 | Shohara | | |
| 2003/0174758 A1 * | 9/2003 | Lundby et al. | .............. | 375/141 |

FOREIGN PATENT DOCUMENTS

| | | |
|---|---|---|
| EP | 853 389 A1 | 7/1998 |
| WO | WO00/38343 A2 | 6/2000 |
| WO | WO 01 59937 A2 | 8/2001 |
| WO | WO 0159937 A3 | 8/2001 |

* cited by examiner

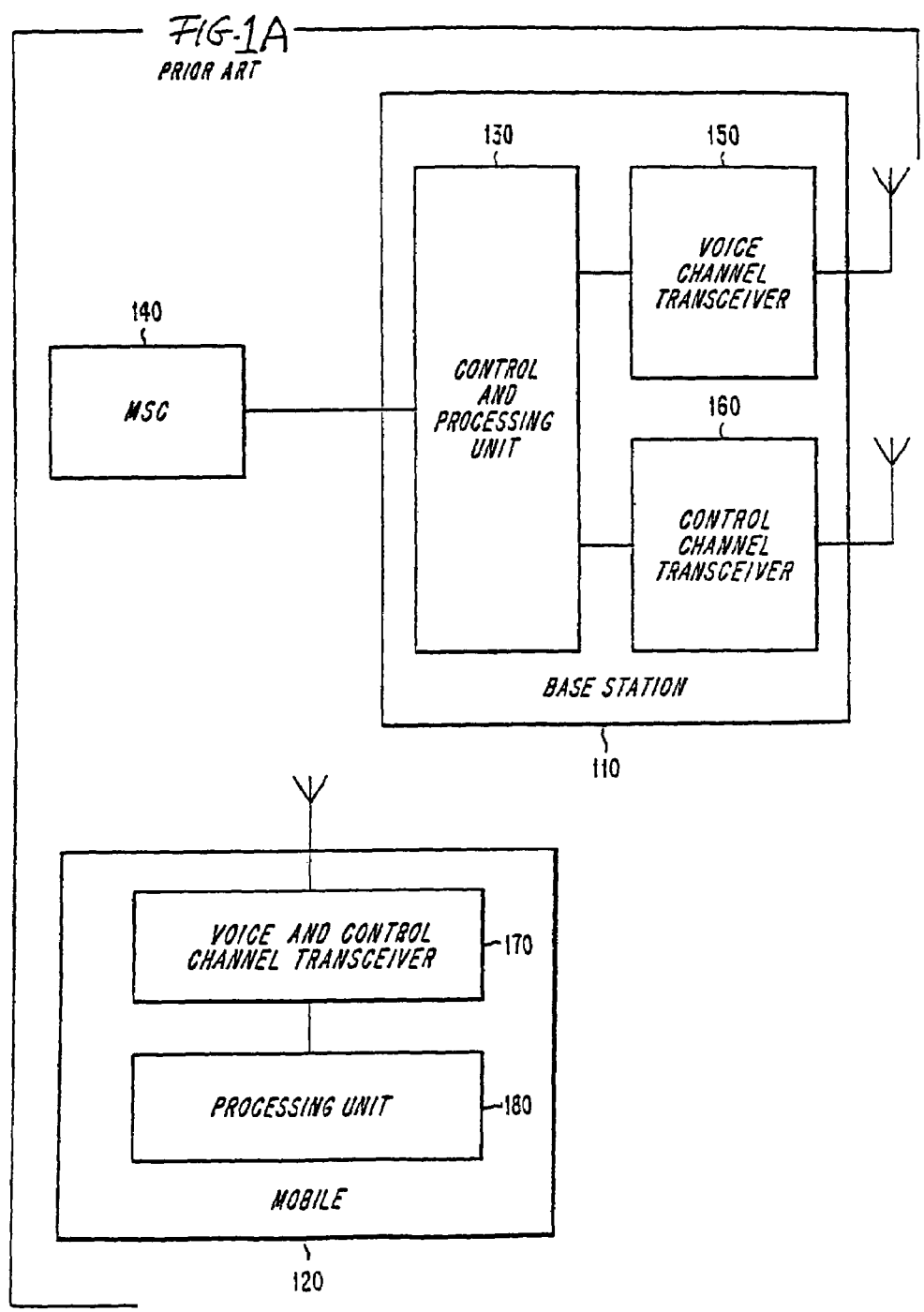

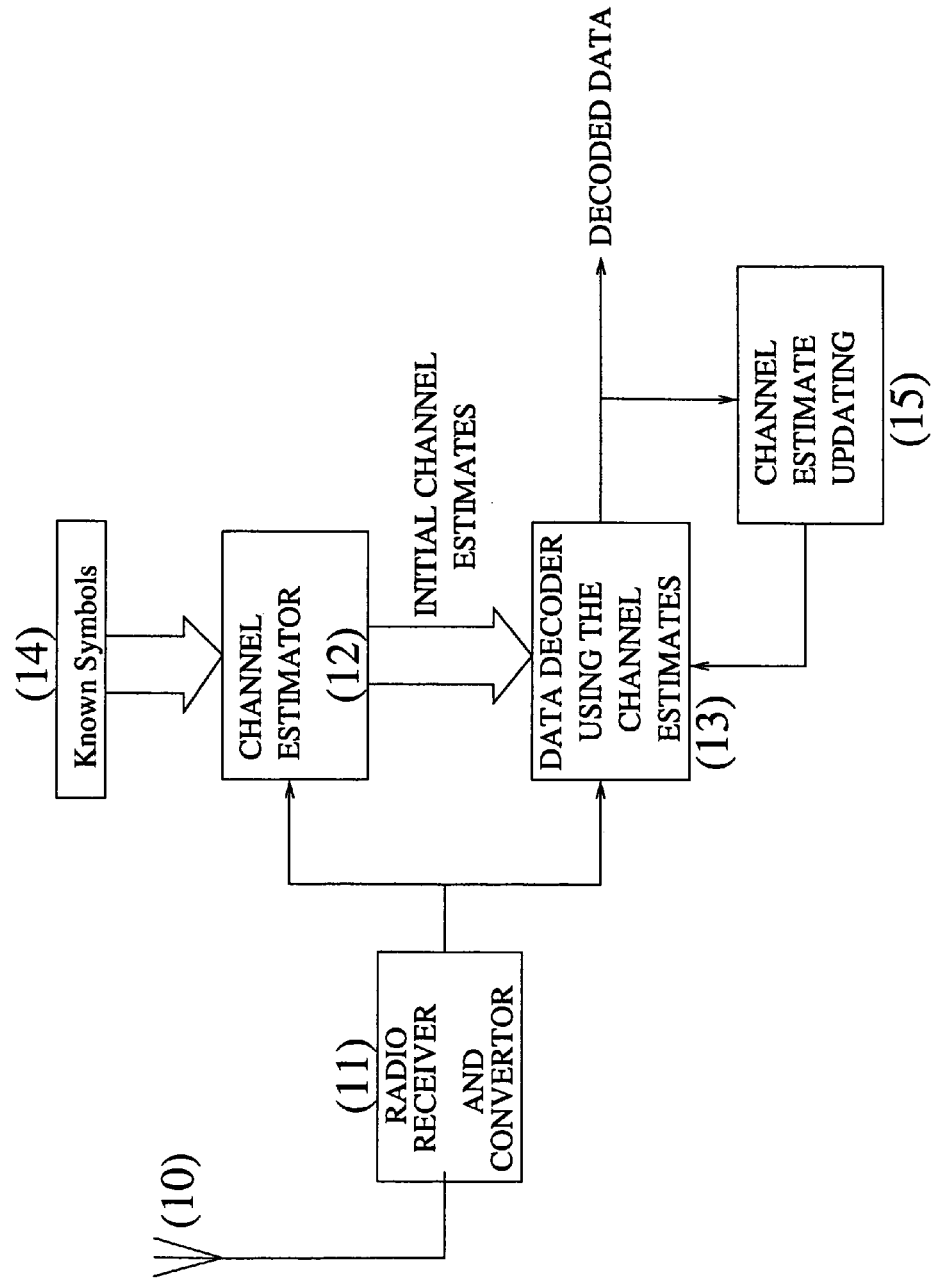

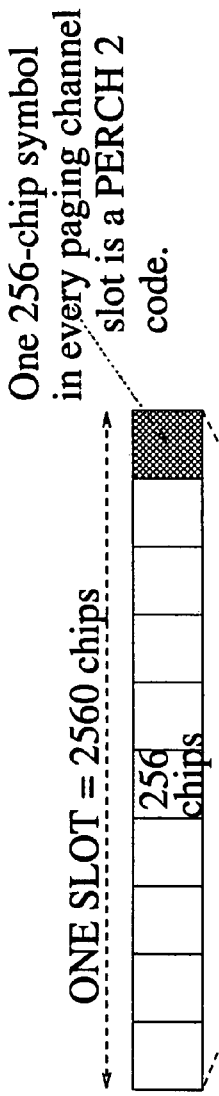
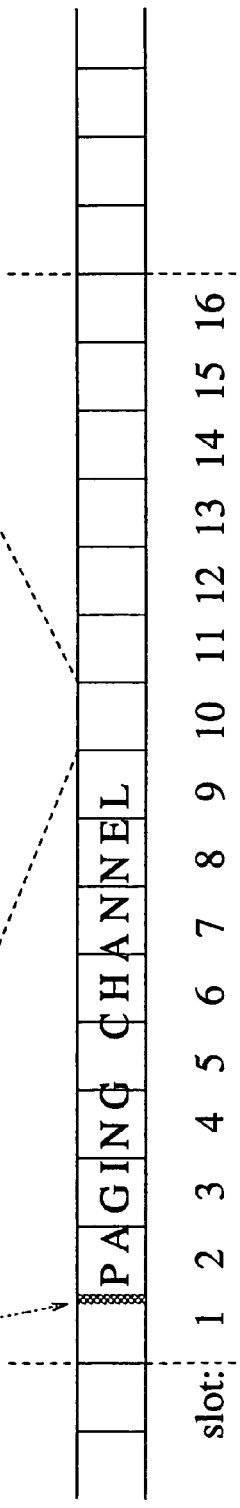
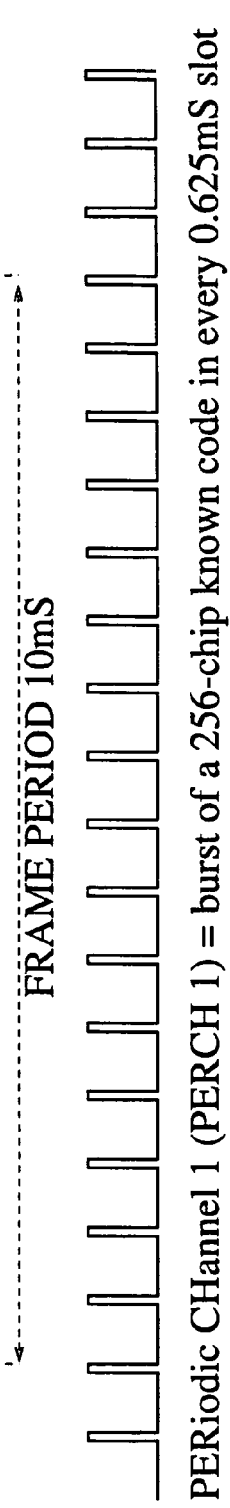
FIG. 2

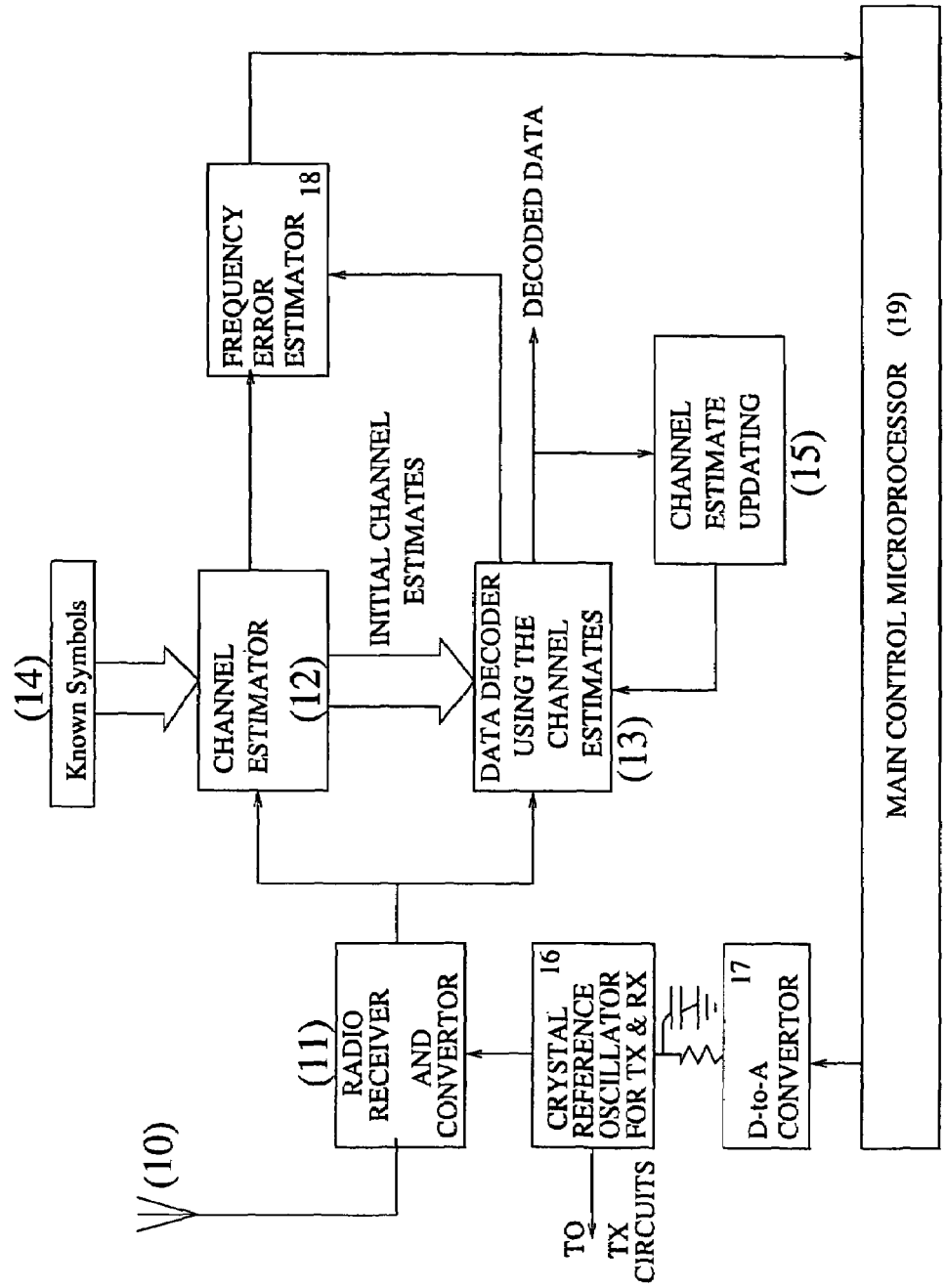

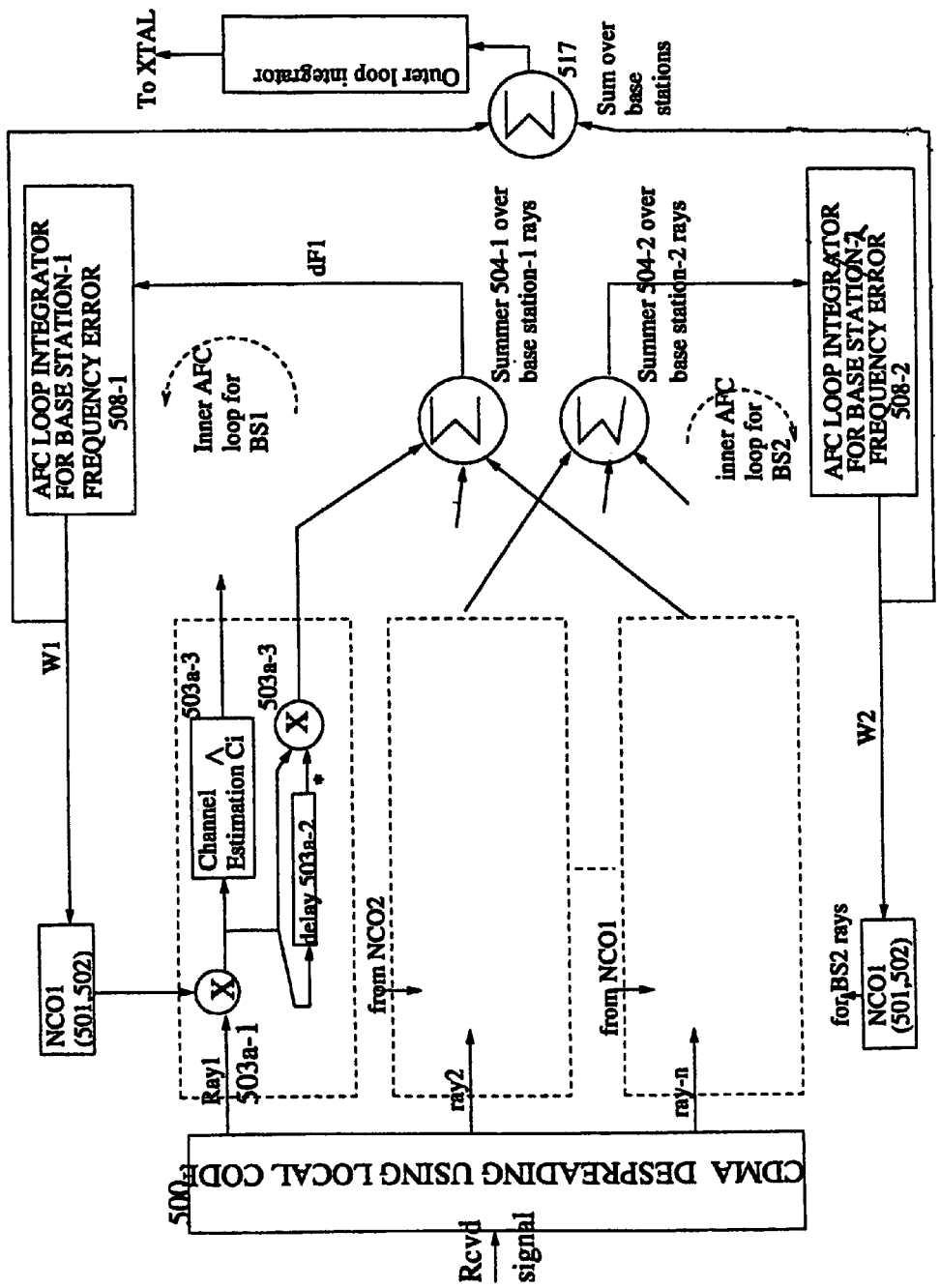
FIGURE 15A: FREQUENCY ERROR ESTIMATION FOR TWO BASE STATIONS

METHOD AND APPARATUS FOR AUTOMATIC FREQUENCY CONTROL IN A CDMA RECEIVER

BACKGROUND

This invention relates generally to a method and system for controlling the reference frequency in a radio receiver. More particularly, this invention relates to a method and system for estimating a frequency offset between a carrier frequency of a transmitter and a local reference frequency of a receiver in a communication system.

FIG. 1A is a block diagram of an exemplary cellular radiotelephone system, including an exemplary base station (BS) 110 and a mobile station (MS) 120. Although denoted a "mobile station", the station 120 may also be another type of remote station, e.g., a fixed cellular station. The BS includes a control and processing unit 130 which is connected to a mobile switching center (MSC) 140 which in turn is connected to a public switched telephone network (PSTN) (not shown). General aspects of such cellular radiotelephone systems are known in the art. The BS 110 handles a plurality of voice channels through a voice channel transceiver 150, which is controlled by the control and processing unit 130. Also, each BS includes a control channel transceiver 160, which may be capable of handling more than one control channel. The control channel transceiver 160 is controlled by the control and processing unit 130. The control channel transceiver 160 broadcasts control information over the control channel of the BS or cell to mobiles locked to that control channel. It will be understood that the transceivers 150 and 160 can be implemented as a single device, like the voice and control transceiver 170, for use with control and traffic channels that share the same radio carrier.

The MS 120 receives the information broadcast on a control channel at its voice and control channel transceiver 170. Then, the processing unit 180 evaluates the received control channel information, which includes the characteristics of cells that are candidates for the MS to lock on to, and determines on which cell the MS should lock. Advantageously, the received control channel information not only includes absolute information concerning the cell with which it is associated, but also contains relative information concerning other cells proximate to the cell with which the control channel is associated, as described for example in U.S. Pat. No. 5,353,332 to Raith et al., entitled "Method and Apparatus for Communication Control in a Radiotelephone System".

Modern communication systems, such as a cellular radiotelephone system of the type described above and satellite radio systems, employ various modes of operation (analog, digital, dual mode, etc.) and access techniques such as frequency division multiple access (FDMA), time division multiple access (TDMA), code division multiple access (CDMA), and hybrids of these techniques.

In North America, a digital cellular radiotelephone system using TDMA is called the Digital Advanced Mobile Phone System (D-AMPS), some of the characteristics of which are specified in the TIA/EIA/IS-136 standard published by the Telecommunications Industry Association and Electronic Industries Association (TIA/EIA). Another digital communication system using direct sequence CDMA is specified by the TIA/EIA/IS-95 standard. There are also frequency hopping TDMA and CDMA communication systems, one of which is specified by the EIA SP 3389 standard (PCS 1900). The PCS 1900 standard is an implementation of the GSM system, which is common outside North America, that has been introduced for personal communication services (PCS) systems.

Several proposals for the next generation of digital cellular communication systems are currently under discussion in various standards setting organizations, which include the International Telecommunications Union (ITU), the European Telecommunications Standards Institute (ETSI), and Japan's Association of Radio Industries and Businesses (ARIB).

Direct-sequence (DS) spread-spectrum modulation is commonly used in CDMA systems, in which each information symbol is represented by a number of "chips". Representing one symbol by many chips gives rise to "spreading", as the latter typically requires more bandwidth to transmit. The sequence of chips is referred to as the spreading code or signature sequence. At a DS receiver, e.g., a rake receiver, the received signal is despread using a despreading code, which is typically the conjugate of the spreading code. IS-95 and J-STD-008 are examples of DS CDMA standards.

In the mobile radio channel, multi-path is created by reflection of the transmitted signal from obstacles in the environment, e.g., buildings, trees, cars, etc. In general, the mobile radio channel is a time varying multi-path channel due to the relative motion of the structures that create the multi-path.

A characteristic of the multi-path channel is that each path through the channel may have a different phase. For example, if an ideal impulse is transmitted over a multi-path channel, each pulse of the received stream of pulses generally has a different phase from the other received pulses. This can result in signal fading.

When multi-path propagation is present, the amplitude can vary dramatically. Multi-path propagation can also lead to time dispersion, which causes multiple, resolvable echoes of the signal to be received. In the receiver, correlators are aligned with the different echoes. Once the despread values have been weighted, they are summed. This weighting and summing operation is commonly referred to as rake combining.

FIG. 1B illustrates a conventional radio receiver employing a channel estimator. The receiver includes an antenna 10 for receiving signals, a radio receiver 11 for filtering and amplifying signals and converting them to a suitable form for processing, such as complex numerical sample values, a channel estimator 12 which correlates received signal samples with known symbols stored or generated locally in a local code generator 14, to provide channel estimates, and a data decoder 13 for despreading and processing despread signal samples together with the channel estimates to extract information. Data decoder 13 may be, e.g., a rake receiver operating in a manner described in U.S. Pat. No. 5,572,552 to Dent and Bottomley, which is hereby incorporated by reference. A channel estimate updater 15 updates channel estimates based on the latest data and/or pilot symbol decisions and the despread signal samples and provides this updated information to the decoder 13. Decoded data is output for further processing.

Coherent detection requires estimation of how the signals were modified by the transmitter, channel, and/or radio processor. As discussed above, the transmission medium introduces phase and amplitude changes in the signal, as a result of multi-path propagation. The signal may also have become dispersed, giving rise to signal echoes, each echo having a phase and amplitude associated with it, represented by a complex channel coefficient. Each echo also has a delay associated with it. Coherent demodulation requires estimation of these delays and coefficients. Typically, the channel is modeled as discrete rays, with channel coefficients assigned to the different delays.

Channel estimation for a received radio signal using both known modulation symbols embedded in the signal as well as unknown information symbols that are decoded by the receiver is described, for example, in U.S. Pat. No. 5,335,250 to Dent et al., and also in U.S. Pat. No. 5,331,666; No. 5,557,645; and No. 5,619,533 to Dent, all of which are hereby incorporated here by reference. Channel estimation specific to CDMA systems is described in U.S. Pat. Nos. 5,151,919 and 5,218,619 to Dent, which are also hereby incorporated here by reference.

More discussion of smoothing channel estimates using autoregression, that is IIR filtering, may be found in "A Wiener Filtering Approach to the Design of Tracking Algorithms with Applications in Mobile Radio Communications", Ph.D. thesis of Lars Lindbom, Uppsala University (1995), which is also hereby incorporated by reference herein. This document describes the benefit of adapting a smoothing filter's characteristics to the fading spectrum of the signal.

In the past, the fading spectrum of a signal was assumed to be symmetrical. This is probably true in the long term (i.e., over several minutes), in accordance with Jakes' model for fading in the urban, mobile radio propagation environment. More discussion of Jakes' model and modifications of the model to speed computation during simulations of communication system performance may be found in P. Dent, G. E. Bottomley, and T. Croft, "Jakes' Fading Model Revisited", Electronics Letters, vol. 29, no. 13, pp. 1162-1163 (Jun. 24, 1993), which is hereby incorporated here by reference.

Jakes' model assumes a uniform angular distribution of reflecting objects around a mobile receiver. The relative Doppler shift of reflected signals arriving at the mobile station at different angles relative to the direction of movement of the mobile station varies with the cosine of the angle of arrival. With a uniform angular distribution, the Doppler spectrum is then symmetrical and two sided, having as much reflected energy arriving from behind the mobile station with a negative Doppler frequency shift as from ahead of the mobile station, having a positive Doppler shift. Rays reaching the mobile station from behind have clearly not propagated an equal distance from transmitter to receiver as rays reaching the mobile station from the front. However, these delay differences have typically been ignored, Jakes' model assuming that rays with such delay differences could nevertheless be combined to produce a net fading waveform for a path of delay equal to the mean of these rays.

More specifically, delays lying within ±0.5 of a modulation symbol period of each other were combined to produce a net fading ray with a mean delay. Delays outside that ±0.5 modulation symbol interval were grouped into a different ±0.5 symbol window to obtain a different net fading waveform with a different mean delay. The different net fading waveforms with their associated modulation-symbol-spaced delays were then taken to characterize a multipath channel, each of the multiple paths nevertheless assuming to conform to Jakes' fading model, i.e., each path is the combination of rays arriving uniformly from all directions.

In a CDMA system, particularly a wideband CDMA (WCDMA) system, chip intervals are much shorter, allowing multiple propagation paths to be resolved with much finer time resolution. Thus, it is no longer valid to use a Jakes' model which adds rays that differ in their propagation delays by even a fraction of a microsecond. This addition was valid only in the context of narrowband FDMA or medium bandwidth TDMA systems. In WCDMA systems, it is necessary to restrict the combination of different rays reaching the receiver to rays that have the same propagation delay from the base station to the mobile station, within ±0.5 of a CDMA chip duration. In the proposed IMT2000 system for next generation mobile telephony which is based on DS-CDMA, a frame has a duration of 10 milliseconds and is divided into 16 slots, each slot being divided into 2560 chips. Depending on the communication channel, 2560 chips are grouped into a number of symbols. For example, in the so-called Perch 1 Channel, there are ten symbols of 256 chips each. A certain number of these symbols are already known and transmitted as pilots from the BS to MSs. One symbol in every paging channel slot is a so-called Perch 2 code. An exemplary CDMA signal format is shown in FIG. 2.

In a 5 MHZ wide WCDMA system, a chip duration is typically 0.25 microsecond (μsec), so ±0.5 chips has a duration of +0.125 μsec, which may be expressed as +37.5 meters in terms of propagation path length variation.

It may be shown that rays with the same delay to this order of accuracy must have reflected from objects lying on an elliptical contour having the base station and the mobile station as its foci. This may be understood with reference to FIG. 3 which depicts elliptical contours representing loci of objects from which the reflection delay is the same. For example, a ray reflected from objects lying on the elliptical contour closest to the mobile station have a delay of T1, rays reflected from objects lying on the next closest elliptical contour have a delay of T2, rays reflected from object lying on the next elliptical contour have a delay of T3, etc.

These objects are not uniformly distributed in angle around the mobile station, nor are they spaced at the same distance from either the mobile station or the base station. Moreover, since the base station lies inside the elliptical contour, if, as is usual, it employs directional transmit antennae, objects around the elliptical contour will not be uniformly illuminated. Consequently, the fading spectrum of a ray of given delay within ±0.5 chip periods will no longer be symmetrical about zero frequency. Rather, the fading spectrum of such a ray will be asymmetrical. This is illustrated in the power spectral plot shown in FIG. 4.

In addition, the offset from zero frequency of the centroid of the fading spectrum is no longer independent of the direction of motion.

One of the purported advantages of WCDMA is that the high time resolution enables resolution of individual reflecting objects such that each resolved ray is a single, non-fading ray, i.e., WCDMA is purported to eliminate fading. Of course, it is recognized that such "non-fading" rays will come and go, but on the relatively longer timescale of lognormal shadowing, which is easier to track. However, each ray will have a varying Doppler spread which means that its phase still varies at up to the Doppler rate, even if its amplitude varies much slower. Thus, there is still the need to track the varying complex value of the propagation channel in order to effect coherent signal decoding, i.e., with knowledge of a phase reference. Moreover, the complete elimination of fading by resolving small reflecting objects is not achieved except using very large bandwidths, beyond the bandwidths of anticipated WCDMA systems, which therefore find themselves in the intermediate region of propagation paths that still each comprise multiple rays. Fading models and channel estimation means for these WCDMA systems are addressed in U.S. patent application Ser. No. 09/227,180 filed Jan. 7, 1999, in the name of Paul Dent, and entitled "Smoothing Channel Estimates by Spectral Estimation". This application is hereby incorporated here by reference.

A receiver in which the smoothing of channel estimates is adapted separately for per ray channel estimation according to the above-incorporated application is shown in FIG. 5, and channel estimation may be performed as in FIG. 6. The arrangement of FIG. 5 includes a per-ray, asymmetrical smoothing filter synthesizer 20, and a per-ray asymmetrical smoothing filter 21.

In a DS spread-spectrum receiver, a frequency offset or deviation may exist between the transmitter carrier frequency and the local oscillator of the receiver. The frequency offset results from different factors, including temperature variation, aging, and manufacturing tolerances. To address this offset, a phase ramp can be estimated and compensated for in an Automatic Frequency Control (AFC) control loop. Estimation can be based on a pilot channel, pilot symbols, or data symbols with a decision feedback.

In the forward (base-to-remote) link of the IS-95 DS-CDMA system, a pilot channel is available for frequency offset estimation. The pilot is transmitted continuously, allowing tracking of variations in the offset.

It is well known that a receiver AFC provides an estimate of the local crystal reference oscillator's error relative to the remote transmitter, and that this AFC estimate can be used to correct the crystal oscillator in order to correct the local transmitter frequency, as shown in FIG. 7. The arrangement depicted in FIG. 7 includes a frequency error estimator 18. However, past attempts to ascribe observed variations in the received signal in part to Doppler channel variation via a channel estimate and in part to a crystal frequency error were inaccurate, as the channel estimate absorbed part of the frequency error.

These problems are made even worse in a handover situation, in which a mobile station communicating with one base station at a certain frequency offset is handed over to another base station with another frequency offset.

Therefore, there is a need to improve upon the discrimination of signal variations due to channel variations from signal variations due to oscillator error.

SUMMARY

It is therefore an object of the present invention to provide a technique for estimating an error between a carrier frequency of a transmitted signal and a local frequency reference in a receiver that accounts for Doppler offset and crystal frequency error. It is yet another object of the present invention to provide a technique for estimating a frequency error between a local frequency reference of a receiver and carrier frequencies of multiple transmitters.

According to exemplary embodiments, this and other objects are met by a method and apparatus for processing code division multiple access signals received through a multipath propagation channel to control the frequency of a local frequency reference oscillator. The received signals are processed using the local frequency reference oscillator to obtain representative complex numerical samples for processing. The complex numerical samples are correlated with shifts of a locally generated despreading code.

According to one embodiment, the correlated signals are complex channel estimates, each corresponding to a different ray of the multipath propagation channel. A frequency error estimate is computed for each ray based on successive values of a respective one of the channel estimates. A summer performs a weighted summation of the frequency error estimates to compute a relative frequency error estimate of the relative frequency error. The frequency error estimate may be computed by multiplying the current value of the respective channel estimate with the complex conjugate of a previous value of the same channel estimate and using the product as the frequency error estimate for the respective ray. An outer loop integrator may be used for integrating the frequency error estimates to produce a frequency error estimate and a control signal to control the local frequency reference oscillator to a value based on the received signal.

According to another embodiment, the correlated signals are streams of complex despread values corresponding to each ray and successive symbol interval. Frequency errors on each of the despread value streams are corrected by progressively rotating the phase angle of successive despread values at a rate given by an associated frequency error integral. The frequency-corrected despread value streams are processed to produce complex channel estimates for each ray, and the residual frequency error estimate for each ray is determined by processing successive values of the channel estimates for the corresponding ray. The frequency error estimates are combined to produce a frequency error estimate and a control signal to control the local frequency reference oscillator to a value based on the received signal. Inner loop integrators may be used for integrating respective residual frequency error values to produce frequency error integrals, wherein the combiner combines the frequency error integrals to produce the control signal. Alternately, an inner loop integrator may be used for integrating the frequency error estimate to produce the inner loop integral values, and an outer loop integrator may be used for integrating the inner loop integral values to produce a control signal to control the local frequency reference oscillator to a value based on the received signal.

According to various aspects, a frequency error estimate may be computed for signals received from one transmitter or from multiple transmitters. For signals received from multiple transmitters, the frequency error estimates may be computed separately for each transmitter and then combined.

BRIEF DESCRIPTION OF THE DRAWINGS

The features, objects, and advantages of this invention will become apparent by reading this description in conjunction with the accompanying drawings, in which like reference numerals refer to like elements and in which:

FIG. 1A is a block diagram of an exemplary cellular radio-telephone communication system;

FIG. 1B illustrates a conventional radio receiver;

FIG. 2 illustrates a format of a CDMA signal;

FIG. 7 illustrates a conventional radio with transmit AFC from the receiver;

FIGS. 15A and 15B illustrate an exemplary apparatus and method, respectively, for estimating a frequency error in signals received from multiple transmitters.

DETAILED DESCRIPTION

For illustrative purposes, the following description is directed to a cellular radio communication system, but it will be understood that this invention is not so limited and applies to other types of communication systems.

According to exemplary embodiments, methods and devices are provided for estimating a frequency error between a local frequency reference and at least one carrier frequency of at least one transmitted signal.

Figure 3:
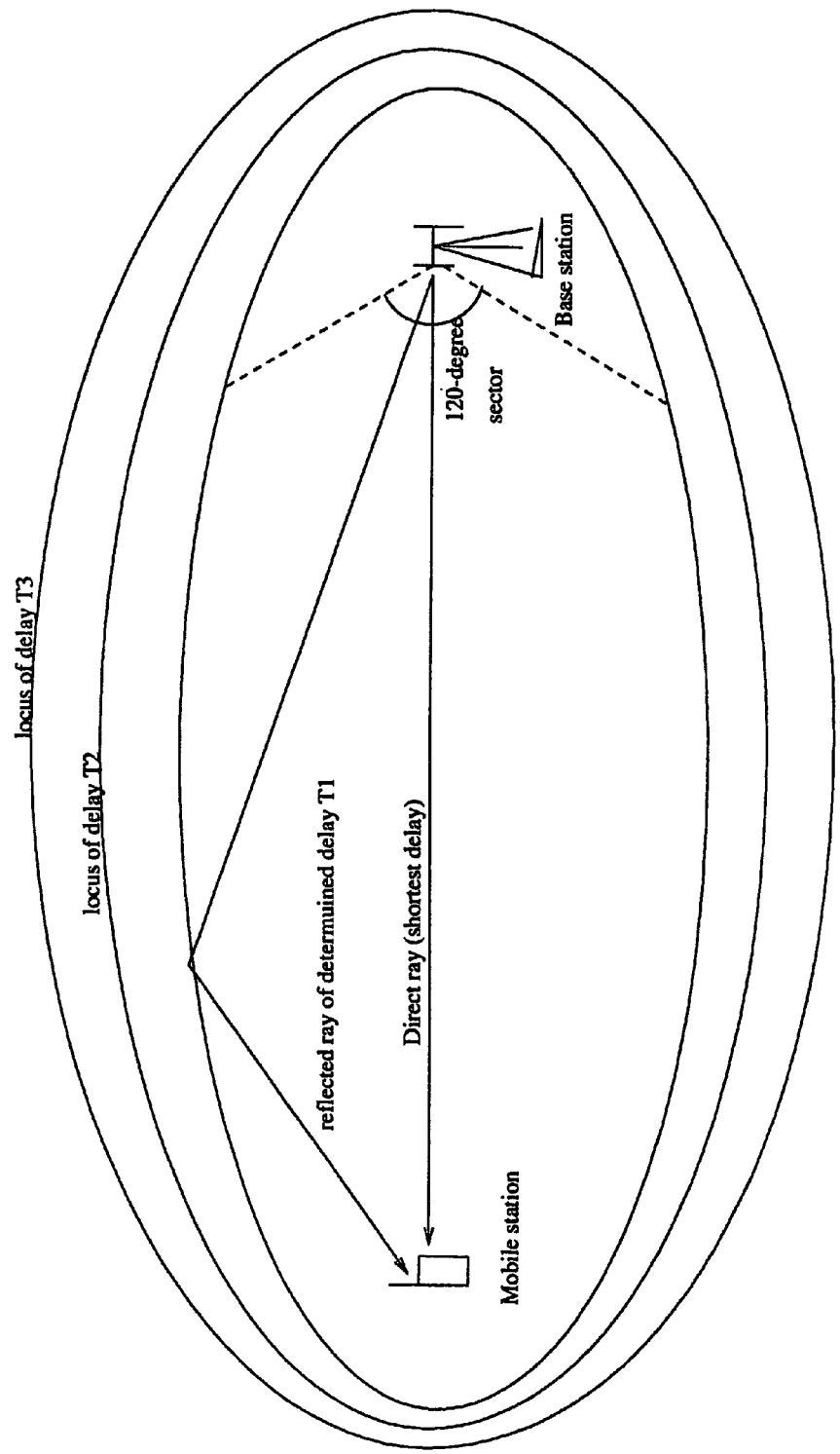
FIG. 3 illustrates loci of reflecting objects of constant path delay.
Figure 4:
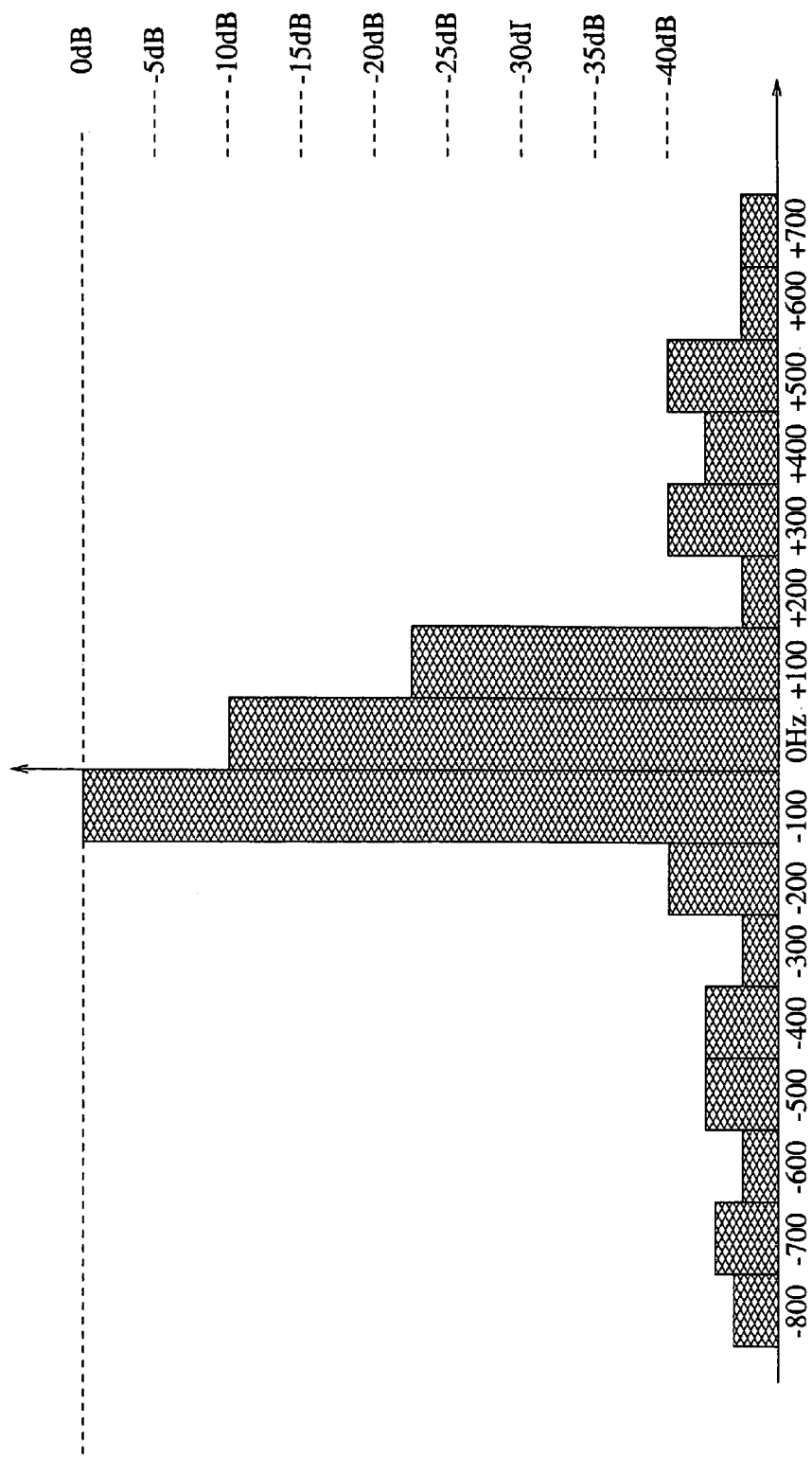
FIG. 4 illustrates a power spectral plot.
Figure 5:
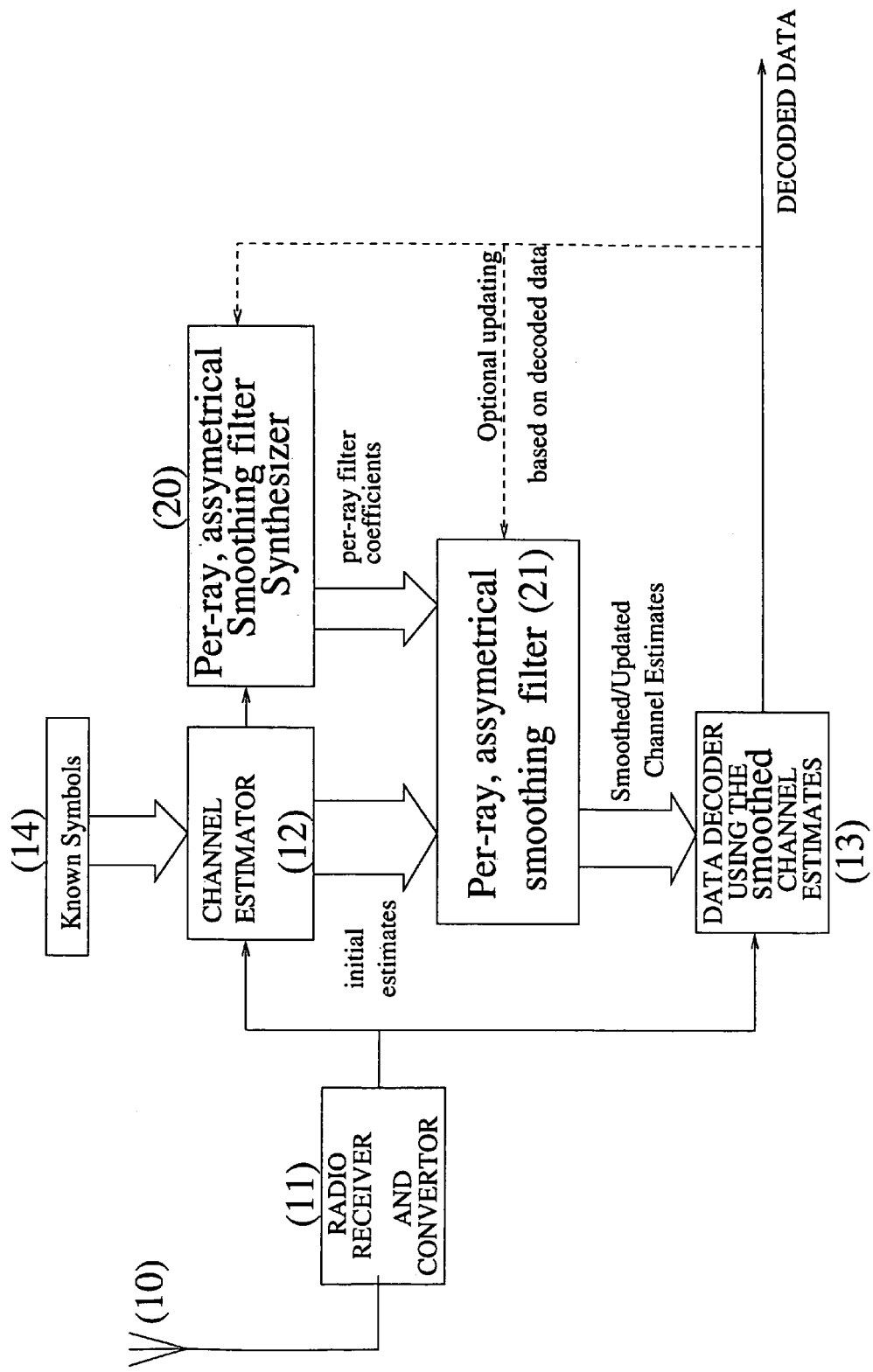
FIG. 5 illustrates a receiver in which the smoothing of channel estimation is adapted separately for each ray.
Figure 6:
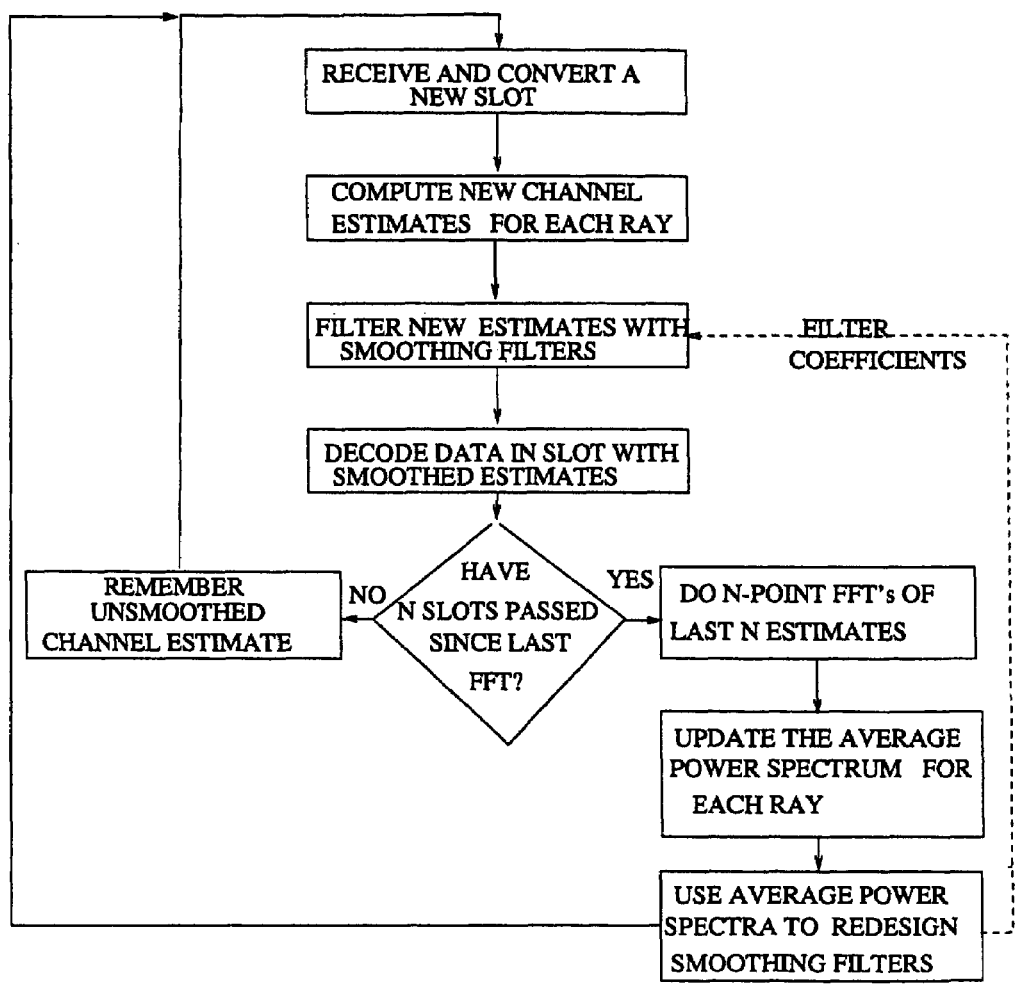
FIG. 6 illustrates a conventional method for channel estimation.
Figure 8A:
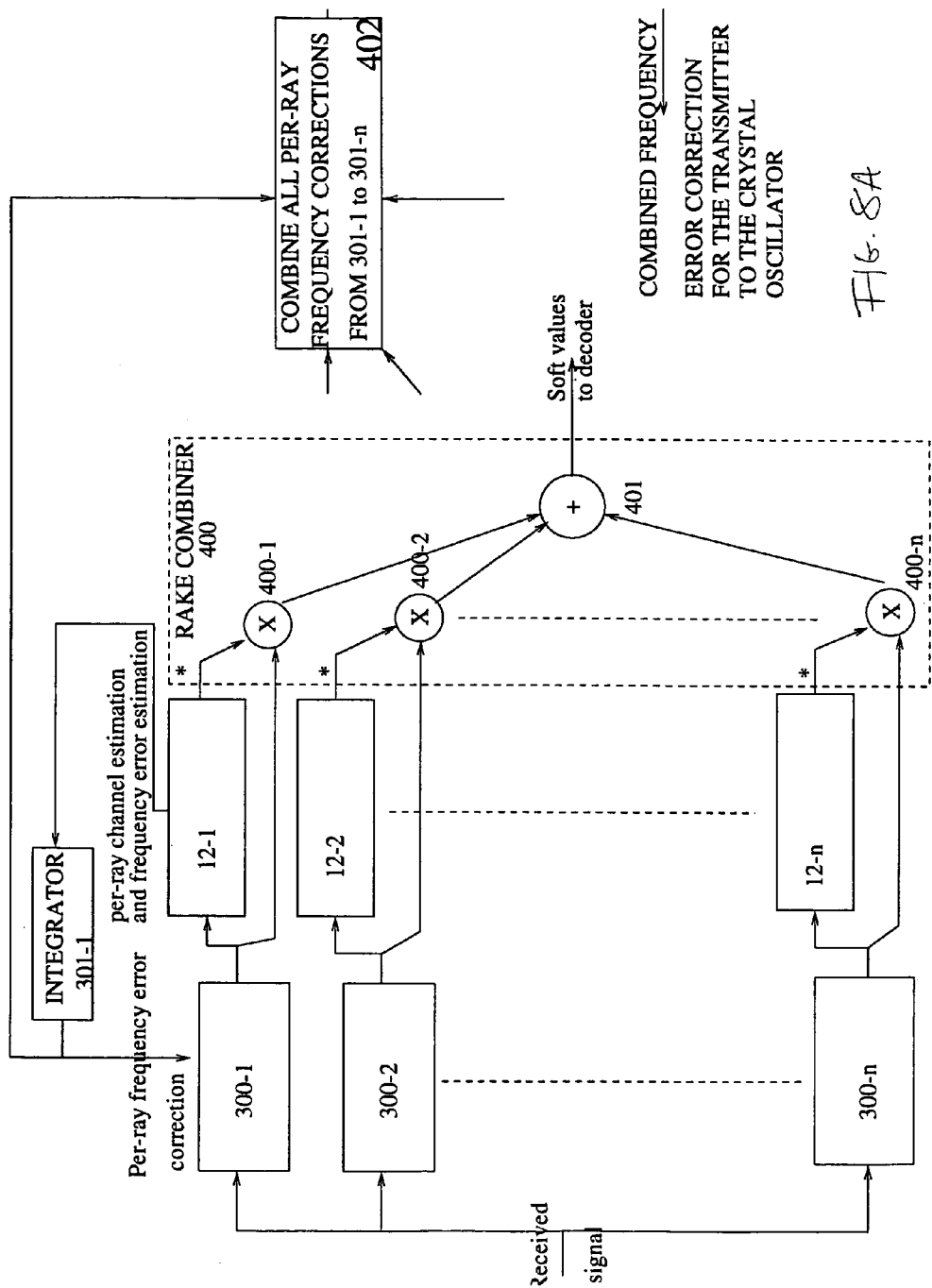
FIGS. 8A and 8B illustrate an apparatus and a method, respectively, for providing simultaneous frequency and channel estimates for each ray, according to one embodiment.

According to one exemplary embodiment, the frequency error is computed by obtaining frequency error and channel estimates simultaneously. Referring to FIG. 8A, a received signal is despread in despreading units 300-1, 300-2, . . . , 300-n to obtain a number of despread values, corresponding to different rays. Despreading may be performed by correlating the complex received signal samples with time-shifts of a locally generated despreading code. An example of an efficient device for simultaneously correlating the same received signal with many time-shifts of a code is described in U.S. Pat. No. 5,9631,893 to Dent and Wang, which is hereby incorporated here by reference.

Despreading units 300-1, 300-2, . . . , 300 n also apply a per-ray frequency error correction, which is different for each ray in this illustrative embodiment. It will be appreciated, however, that the frequency error correction may be a common frequency error correction, i.e., the same correction may be applied for each ray, and may be applied once on the received signal input to blocks 300-1 to 300-n instead of separately at each block. When separate frequency corrections are applied, this results in a cumulative phase-untwisting of the phase angle of successive complex output values to compensate for the tendency of the frequency error to progressively rotate the phase angle. That is, if the frequency error on ray 2 that is despread by unit 300-2 causes a phase rotation of +10 degrees per output sample, then the frequency correction will rotate one despread output sample by −10 degrees, the next by −20 degrees, the next by −30 degrees and so forth. If the frequency correction is accurate, this eliminates the tendency of the output samples to progressively rotate in phase. To determine that this has been accomplished, per-ray frequency and channel estimators 12-1, 12-2, . . . , 12-n determine separately for each ray whether any progressive rotation tendency remains. Channel estimation may be carried out by observing the despread values when the underlying information symbol modulation includes known symbols. For example, if the underlying information symbol modulation is QPSK, in which symbols have nominally unit amplitudes and phases of either ±45 degrees or ±135 degrees, and a particular 2-bit symbol is known, then the despread value may be "unmodulated" by removing the phase angle modulation due to the known symbol, the remaining value being due only to the propagation channel's phase and amplitude. By filtering or adding such values obtained from known symbols, an average value of the channel estimate for a particular multipath ray is obtained.

In the signal format shown in FIG. 2, each of the slots of 2560 chips contains a number of known symbols. If each symbol is spread to 256 chips, then each slot contains 10 symbols. A certain number, e.g., four, of these symbols per slot may typically be known symbols used for channel estimation. Thus, channel estimates based on a certain number of these "pilot" symbols are obtained every slot, and their complex values should not exhibit a systematic phase rotation if frequency error has been removed. Consequently, the residual frequency error can be determined by measuring the difference in phase from one channel estimate to the next. This may be computed by forming the product:

$$Ck_i \cdot Ck^*_{i-1}$$

where $Ck_i$ is the channel estimate for ray k, slot i and $Ck^*_{k-1}$ is the conjugate of the channel estimate for ray k in the previous slot. It will be recalled that channel estimates have had known symbol modulation removed. Therefore, the only cause of phase rotation from one slot to the next is uncorrected frequency error. This shows up as a non-zero imaginary part of the above product. The angle of this frequency estimate corresponds to a frequency error and can be used with appropriate smoothing to obtain an improved frequency error estimate. Although only the angle of the frequency estimate corresponds to the frequency error, in the interest of simplicity, the entire frequency estimate is referred to at various places in this application as the frequency error estimate. The magnitude of this differential phase estimate (or frequency estimate) is also proportional to the square of the ray magnitude $|Ck|$. In another implementation that will be described, the optimum common frequency error estimate across all rays is obtained by adding the imaginary parts of the above products across all rays (index k varying), as the squared-amplitude weighting thereby obtained is optimum for producing a common frequency error estimate. In FIG. 8A, however, the per-ray frequency error estimate from the imaginary part of the above product is applied to the ray-associated, AFC loop integrators 301-1, 301-2, . . . , 301-n, only one of which is shown for ease of illustration. The AFC loop integrator forms a first order AFC loop guaranteeing that the mean frequency errors from frequency error and channel estimators 12-1, 12-2 . . . , 12-n will be zero. If the mean frequency error is not zero, but, e.g., positive, the associated integrator ramps up and applies an ever increasing "detwisting" in the associated frequency error correction unit (one of 300-1, . . . , 300-n) until the mean frequency error is zero. At that point, the integrated frequency error from integrator 301-1 is the true mean frequency error for the associated ray.

In addition to producing frequency error indicators, the device of FIG. 8A includes a rake combiner 400 for producing soft data values. The rake combiner 400 multiplies frequency-corrected, despread values from despreaders 300-1 to 300-n with the conjugates of the corresponding channel estimates from channel and frequency error estimators 12-1, . . . , 12-n in complex multipliers 400-1, 400-2, . . . , 400-n. The results are then added in a summer 401 to produce a soft data value. The channel estimates are derived using known symbols, e.g., from a pilot channel, while the despread values relate to unknown symbols. Thus, the rake-combined soft values are indicative of the unknown symbols. The soft values from one whole frame of the signal format of FIG. 2 may constitute an error-correction and detection coded block. When the whole block is received, error correction and detection of the soft values is performed to obtain an error indication. If the error indication indicates correct decoding, then it is deemed that the received signal was a genuine signal and of sufficient reliability that the frequency errors present on the output of per-ray AFC loop integrators 301-1, 301-2, . . . , 301-*n* may be used to determine a correction to the crystal reference oscillator. This overall frequency error estimate is determined from the per-ray frequency error estimates using the combiner 402.

While FIG. 8A shows a Rake Combiner 400 for processing soft values, one skilled in the art will appreciate that other forms of demodulation may be used, including forms of multiuser detection, as well as the approach described in the co-pending U.S. application Ser. No. 09/165,647, filed Oct. 2, 1998, in the name of G. Bottomley. This application is hereby incorporated here by reference.

There are many ways to determine an overall frequency error estimate, also referred to as a relative frequency error estimate, from the per-ray frequency errors, all of which may be suitable for implementing this invention. The techniques for determining the overall frequency error estimate differ in how much weight is placed on the per-ray frequency error estimates depending on their signal-to-noise ratios. In one example, no weighting is used. The rays processed in FIG. 8A have already been assumed to have been selected to be the strongest N rays out of total number of tested ray positions greater than N, and thus their frequency error estimates are simply averaged in the combiner 402. In another example, it can be argued that three positive frequency errors of +100 Hz, +110 Hz and +120 Hz and one negative frequency error of −130 Hz are just indicative of a Doppler spread between −130 Hz and +120 Hz, with more reflecting objects giving rise to multipath rays of positive Doppler. According to this argument, the overall frequency error is half the sum of the extreme positive value of +120 Hz and the extreme negative value of −130 Hz, giving a result of −5 Hz. The third option is to weight the individual frequency errors by the average energy of the associated ray, which, for example, is available as the real part of the product $Ck_i \cdot Ck^*_{i-1}$.

In all cases, if the overall frequency error only needs to be estimated every 10 msec frame, the quantities from which it is derived should be averaged over that time period to reduce noise. Alternatively, the overall frequency error can be derived more often and averaged over a 10 msec frame period to reduce variance.

Figure 8B:
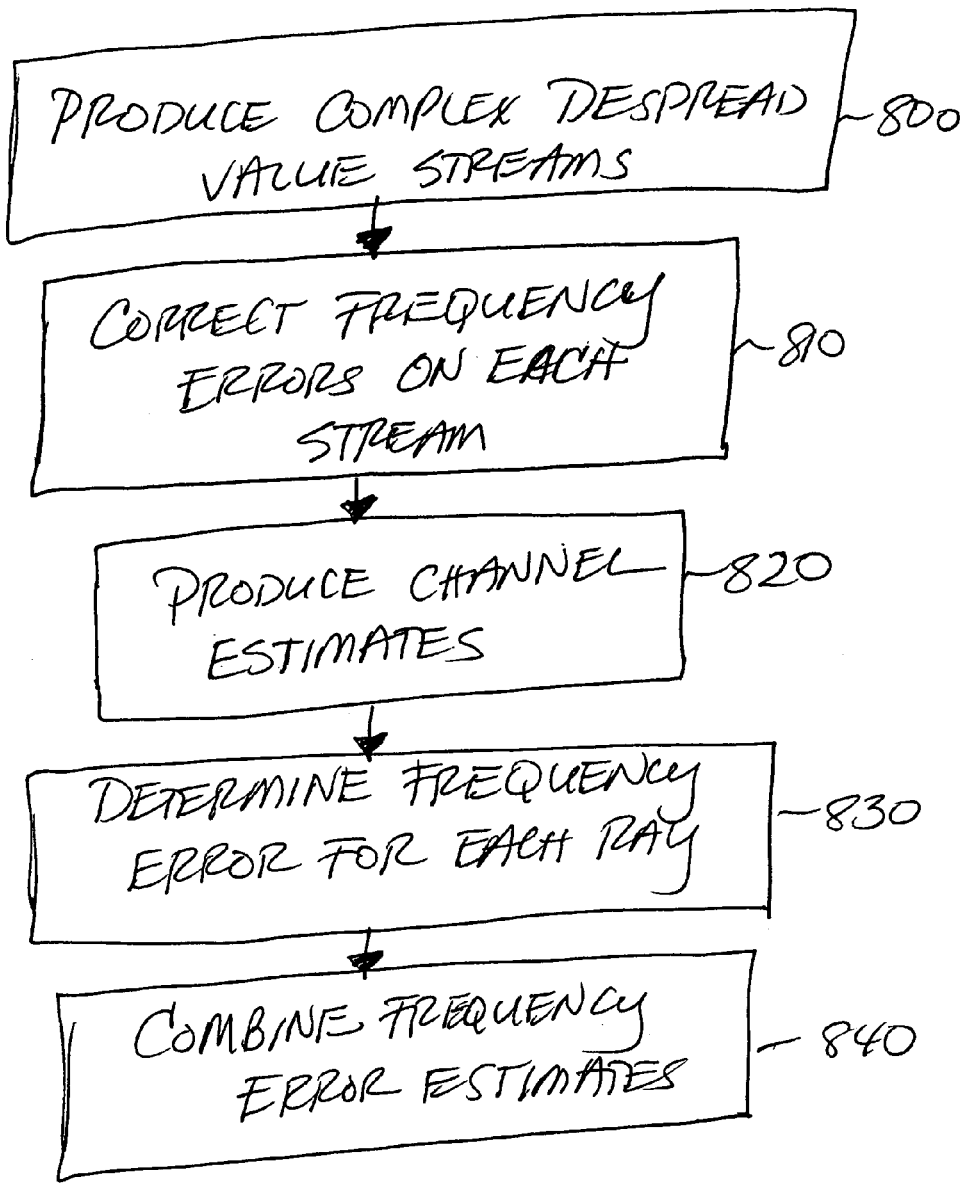

FIG. 8B illustrates an exemplary method for estimating a frequency error according to the first embodiment. The method begins at step 800 at which complex despread value streams are produced. At step 810, frequency errors for each stream are corrected. At step 820, channel estimates are produced. At step 830, the residual frequency error for each ray is estimated. At step 840, the frequency error estimates are combined to form a relative frequency error estimate.

It may not be necessary in a particular application to use per-ray frequency correction. Usually, the channel estimators are sufficiently agile to track ray-to-ray and slot-to-slot phase variations, as long as the overall frequency error is not large. Thus, it is perhaps of greater importance to ensure a low overall frequency error.

Figure 9A:
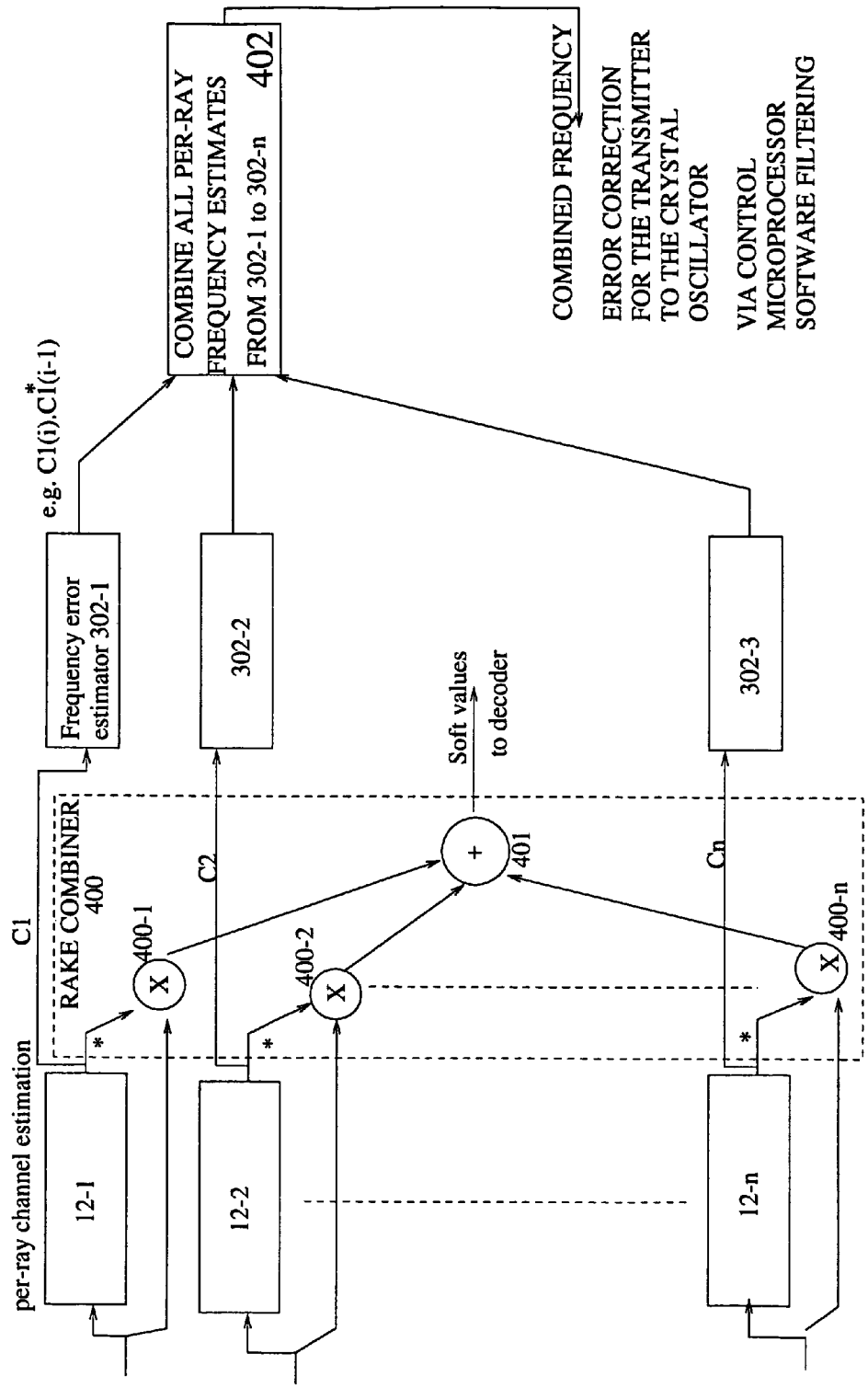
FIGS. 9A and 9B illustrate an apparatus and a method, respectively, for computing per-ray frequency error estimates by processing successive per-ray channel estimates according to a second embodiment.

Thus, according to a second embodiment, a device is provided that uses per-ray channel estimation but not per-ray frequency correction. Referring to FIG. 9A, a device according to the second embodiment includes a per-ray channel estimator (12-1, 12-2, . . . , 12-*n*) and a rake combiner 400 as in FIG. 8A, but there is no per-ray frequency correction. Frequency error estimators 302-1, 302-2, . . . , 302-*n* for each ray determine any systematic phase rotation tendency for each ray by multiplying a channel estimate at time (i) by the conjugate of the channel estimate at time (i−1).

The sum of these products is then accumulated in the combiner 402, which is labeled the same in FIG. 9A as in FIG. 8A to indicate similarity of function. The sum from the combiner 402 has an imaginary part and a real part, and the overall frequency error estimate is ARCTAN(imag/real) (or (imag/real) for small errors). The imaginary and the real parts may be averaged over the estimate period (e.g., one 10 msec frame) before computing their ratio or ARCTANGENT. As an alternative, frequency error estimators 302-1, 302-2, . . . , 302-*n* may produce a per-ray frequency error estimate, by multiplying a channel estimate at time (i) by the conjugate of the channel estimate at time (i−1) and then computing an ARCTAN (imag/real). In this case, combiner 402 does not require an ARCTAN operation.

The average result is then dumped to a control processor such as the control microprocessor 19 of FIG. 7, which, according to an exemplary embodiment, contains a software AFC loop integrator to form the overall AFC loop including the crystal reference oscillator. The software AFC loop integrator can, for example, comprise an integer variable to which the new frequency error estimate is added every 10 msec frame. The accumulated frequency error estimate is then used to output a control code via a digital-to-analog convertor to obtain an analog control voltage for a voltage-controlled crystal oscillator, thereby adjusting its frequency until the mean of the successive frequency error estimates is zero, and the loop integrator reaches a more or less stable mean value. In a refinement, the stable value can be paired with a temperature estimate and stored by the control processor 19 in a crystal temperature-compensating table, from where it can be retrieved as an initial value upon next using the apparatus after a period of shut down. Entry of values into such a long-term temperature table can be severely restricted by various sanity checks and verification that the signal being received was from an authorized base station transmitter.

In FIG. 9A, the combined or relative frequency correction is used to correct the crystal. In addition, or alternatively, the combined frequency error correction may be used to rotate the channel estimates for use in rake combining, as further discussed in co-pending U.S. application Ser. No. 08/991,770, filed Dec. 16, 1997, in the names of G. Bottomley et al. This application is hereby incorporated here by reference.

Figure 9B:
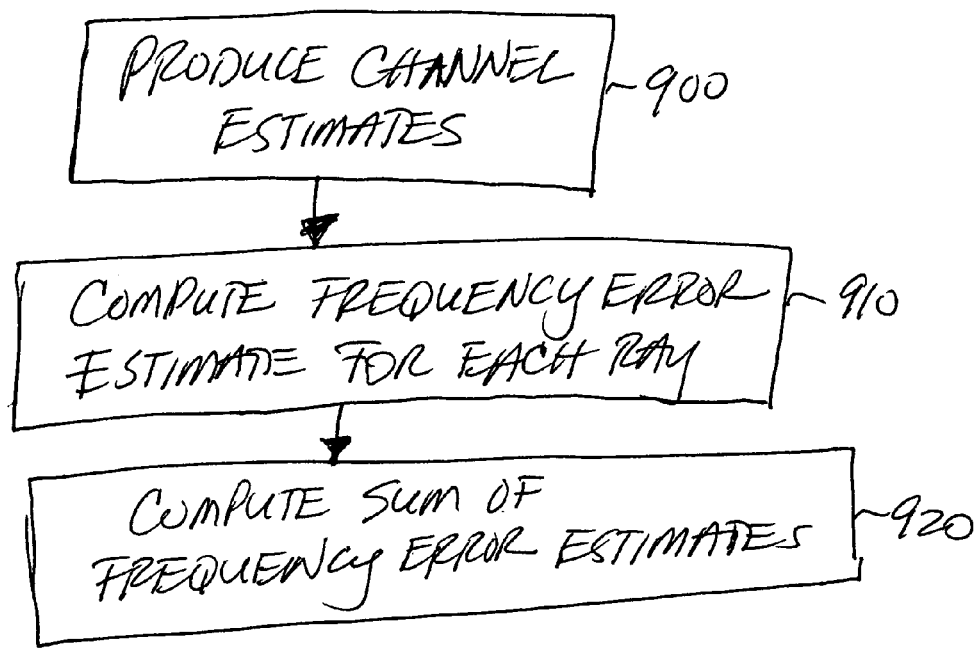

FIG. 9B illustrates an exemplary method for estimating a frequency error according to the second embodiment. The method shown in FIG. 9B is similar to that shown in FIG. 8B, except that the frequency error estimate is computed at step 910 from the channel estimates produced at step 900, with no frequency correction taking place in advance. A weighted sum of the frequency error estimates is produced at step 920.

In the devices shown in FIGS. 8A and 9A, the frequency error and channel estimates are based on the use of pilot symbols embedded periodically in the transmitted signal format or on a common pilot channel. However, in some cases, an overall frequency error estimate should not be believed or acted upon unless the error correction and detection decoder indicates successful decoding of unknown symbols. Thus, with some increase in complexity, it is possible to defer making an overall frequency error estimate until the unknown symbols have been decoded and thus become known symbols. Substantially all symbols may then be used in a retrospective channel and frequency error estimation procedure which is otherwise identical to the process already described above. The "post-decoding" frequency error estimate will benefit from the error correction decoding process and provide a more accurate and less noisy frequency error estimate.

Figure 10:
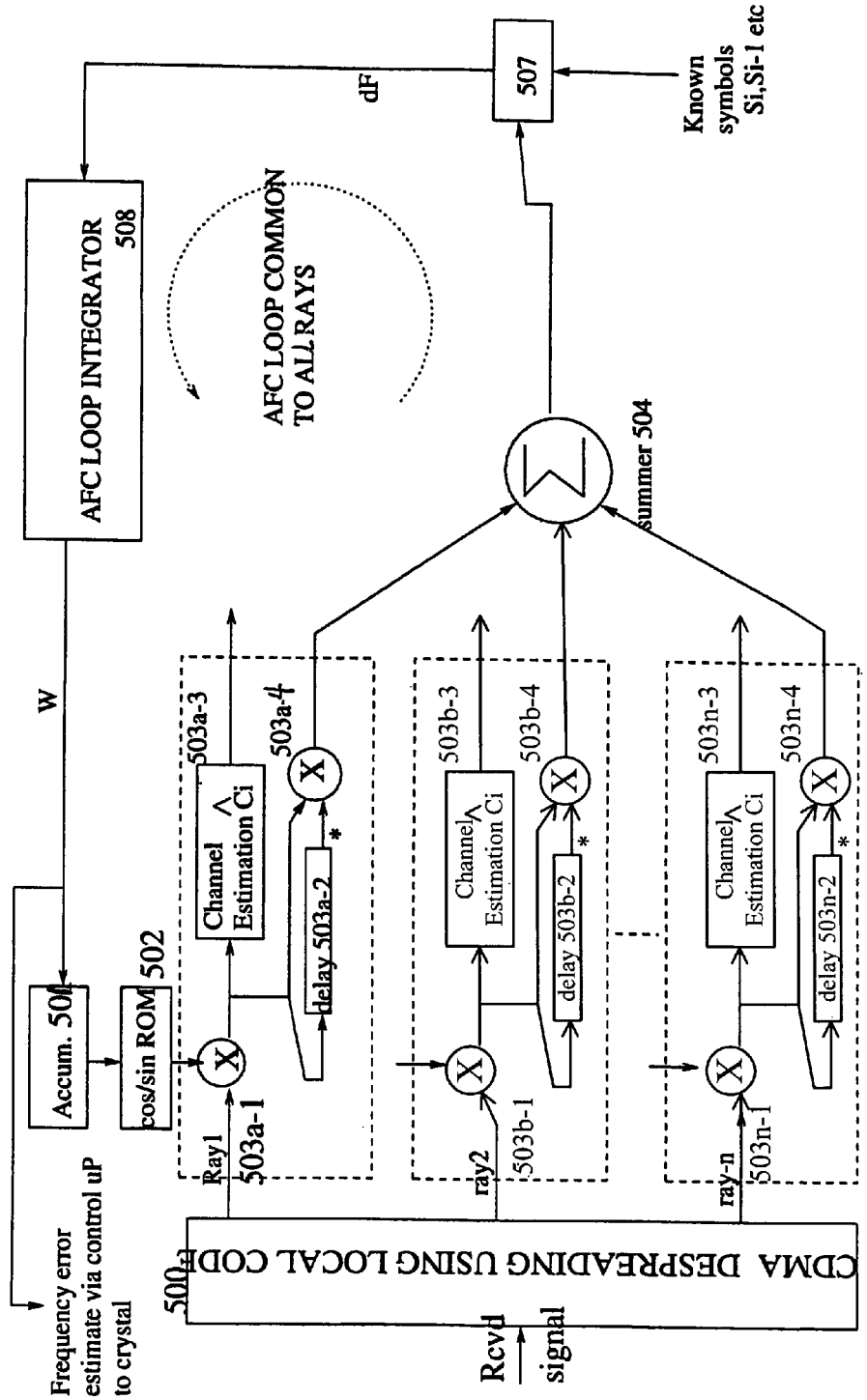
FIG. 10 illustrates an exemplary apparatus for providing a common frequency error estimate by combining per-ray despread values.

FIGS. 10-13 illustrate various implementations of an overall AFC loop according to exemplary embodiments. In FIG. 10, a common AFC loop including an AFC loop integrator 508 develops an estimate of overall or relative frequency error. The frequency error from the integrator 508 is converted to a progressively rotating phase by successively adding the frequency error W to an accumulator 501, thereby generating Wt for progressively increasing time t. The accumulator 501 operates modulo-$2\pi$, i.e., upon overflow, the remainder in the accumulator 501 continues to correctly represent the angle, now reduced by $2\pi$. The cos/sin ROM 502 uses the instantaneous angle from the accumulator 501 as an address and outputs $\exp(-jWt)=\cos(Wt)-j\sin(Wt)$. This complex number is multiplied using respective multipliers 503$a$-1, 503$b$-1, etc., by the despread outputs for each ray from the despreading unit 500 to apply the frequency correction prior to channel estimation in channel estimators 503$a$-3, 503$b$-3, . . . , 503$n$-3. Thus, the despread values are "untwisted" to remove systematic phase rotation caused by frequency error for the purposes of channel estimation. The untwisted despread values are also delayed by one information symbol period in per-ray delay units 503$a$-2, 503$b$-2, . . . , 503$n$-2, and the conjugates of the delayed values are multiplied by the corresponding undelayed values in multipliers 503$a$-4, 503$b$-4, . . . , 503$n$-4. The multiplied results are then summed in a summer 504, which yields a sum in which, if the effects of symbol-period to symbol-period changes in the information symbols were not present, the change in phase over a symbol period which represents uncorrected frequency error would appear as a non-zero imaginary part in the sum output.

A unit 507 computes ARCTANGENT (imag/real) to yield the change in angle over the one symbol period of delay. This arctangent function is a so-called two-argument arctangent which places the angle in the correct quadrant based on the signs of the real and imaginary parts out of summer 504. Then, the unit 507 subtracts the change of angle caused by the change of the modulating information symbol from symbol S(i−1) to symbol S(i). This of course presupposes that the symbol change is known. For example, any pilot symbols and/or unknown data symbols can be used to control frequency error by waiting until after symbols are error correction decoded and then retrospectively updating the AFC loop integrator or by making a tentative decision on the most likely value of the unknown symbol change based on the differential phase value. For example, if the differential phase value is within ±45 degrees, the differential change due to symbol modulation may be assumed to be zero S(i)=S(i−1), and the phase change may be ascribed to frequency error. On the other hand, if the differential phase change is between +45 and +135 degrees, it may be assumed that the differential symbol change was responsible for 90 degrees of phase change. Then, 90 degrees is subtracted, and the residual differential phase change is used as the frequency error. The latter reduction of the phase modulo $\pi/2$ may be accomplished by choosing the appropriate modulo $-2\pi$ digital phase representation as a fixed point integer, adding 45 degrees, masking off the most significant two bits, then subtracting 45 degrees.

The system of FIG. 10 is a self-contained receiver AFC loop that corrects a frequency error for channel estimation and data demodulation. However, it is also desirable to correct the local transmitter frequency by correcting the local crystal reference oscillator. The frequency error W present on the receiver AFC loop integrator 508 is thus output to the main control microprocessor 19 where it is digitally accumulated in another, slower loop integrator. Moreover, particularly when data symbols are used, the values are preferably accumulated in the digital (software) integrator only upon error correction and detection decoding indicating no uncorrected data errors are present. The accumulated value in the software loop integrator in the control processor 19 is then output via the D/A converter 17 of FIG. 7 to adjust a reference crystal oscillator such as the oscillator 16 of FIG. 7, thus closing a slower AFC loop around the reference oscillator 16. The closed loop transfer function of the inner (receiver) AFC loop including a loop integrator 508 acts like a low-pass pole within the outer AFC loop including the control processor 19, D/A convertor 17 and crystal oscillator 16. The design of the outer loop is stable and well-damped when this inner-loop pole is included.

Figure 11:
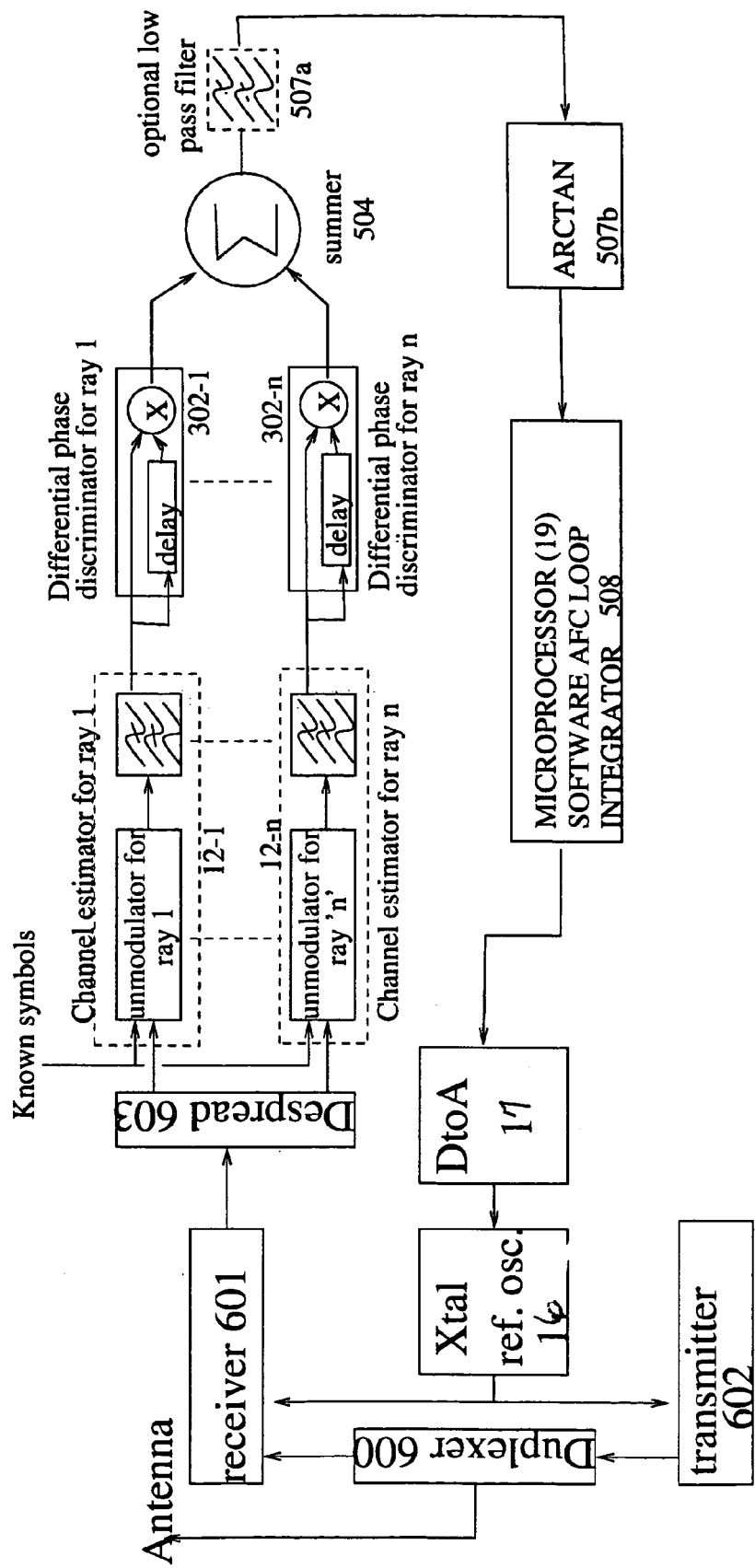
FIG. 11 illustrates an exemplary apparatus for providing a common frequency error estimate using an AFC loop without an inner AFC loop.

FIG. 11 illustrates the general form of a common AFC loop without per-ray AFC according to another embodiment. A duplexor 600 connects the antenna to both the receiver 601 and the transmitter 602, which both use the crystal reference oscillator 16 for accurate frequency channel determination. The receiver 601 filters, down converts, samples and digitizes the received signal to obtain numerical samples at a multiple of the CDMA chip rate in a conventional manner. A despreader 603 uses local CDMA code generators in correlation with the numerical samples to despread the CDMA samples to obtain one complex number per information symbol for each of the selected multipath rays of significance. Unmodulators, one for each ray, remove phase changes due to known symbol modulation (if necessary). If the pilot symbols are all the same, viewing the common pilot channel as a series of pilot symbols, there is no need to remove the modulation. Unmodulation may be performed by multiplying the symbols by their conjugates. The unmodulated samples are accumulated or low-pass filtered over some period of known symbols. It will be appreciated that, when the known symbols, such as pilot symbols, are inserted at the remote transmitter, the combination of unmodulating and filtering is equivalent to pilot-assisted, per-ray channel estimators 12-1, . . . , 12-$n$. However, data symbols that only become known after decoding may also be used for unmodulation.

The filtered, unmodulated, per-ray complex values are then subject to differential phase discrimination (302-1, . . . , 302-$n$) which multiplies the latest value by the conjugate of a previous, delayed value in order to determine a complex number related to the phase change over the delay interval. The delay interval may be one symbol period, one slot period (referring to FIG. 2) or just one or more intervals between successive outputs of the channel estimator. However, the interval should not be so long that the phase change in the period could suffer from modulo-$2\pi$ ambiguity or "wrap-around". The choice of the interval therefore determines a maximum frequency error that can correctly be estimated. The outputs of the differential phase discriminators are already correctly weighted to be added. The sum of these differential complex numbers is formed in a complex summer 504. It will be appreciated that the single arrows entering and leaving boxes such as 302-1 or 504 or 507$a$ are in fact carrying complex numbers that have both a real and an imaginary part. The complex number output from the summer 504 may be optionally further low-pass filtered in a low-pass filter 507$a$, which includes a filtering channel for the real part and an identical filtering channel for the imaginary part. In the numerical domain, such filters can be finite impulse response (FIR) or infinite impulse response (IIR) filters defined by a number of coefficients that set the filter bandwidth or time-constants.

The filtered, combined differential complex values are then converted to a phase change value over the delay interval, e.g., using two-argument ARCTAN function (i.e., four-quadrant ARCTAN) 507b. The phase change in a fixed delay interval is an estimate of the relative frequency error and is conveyed to a control microprocessor 19 where it is integrated in a software loop integrator 508, depending, e.g., on whether the microprocessor receives a separate confirmation of correct decoding of received data from an error correction/detection decoder. The latter criterion is not intended to be a limitation of the invention but represents a feature of the preferred implementation. The software loop integrator value is then output to the DtoA convertor 17 to form an analog control voltage for the crystal reference oscillator 16, thereby correcting frequency error for both the receiver 601 and the transmitter 602. The use of a D/A converter 17 driving a voltage-controlled crystal oscillator (VCXO) is not meant to be a limitation of the invention, but is a typical practical implementation. Alternately, a frequency synthesizer with fine frequency control steps, such as a Direct Digital Synthesizer (DDS) or a fractional-N synthesizer, may be used, in which case the software loop-integrator 508 output value would be added to the synthesizer control code to effect fine adjustment of the receiver 601 or transmitter 602 channel frequency.

Figure 12:
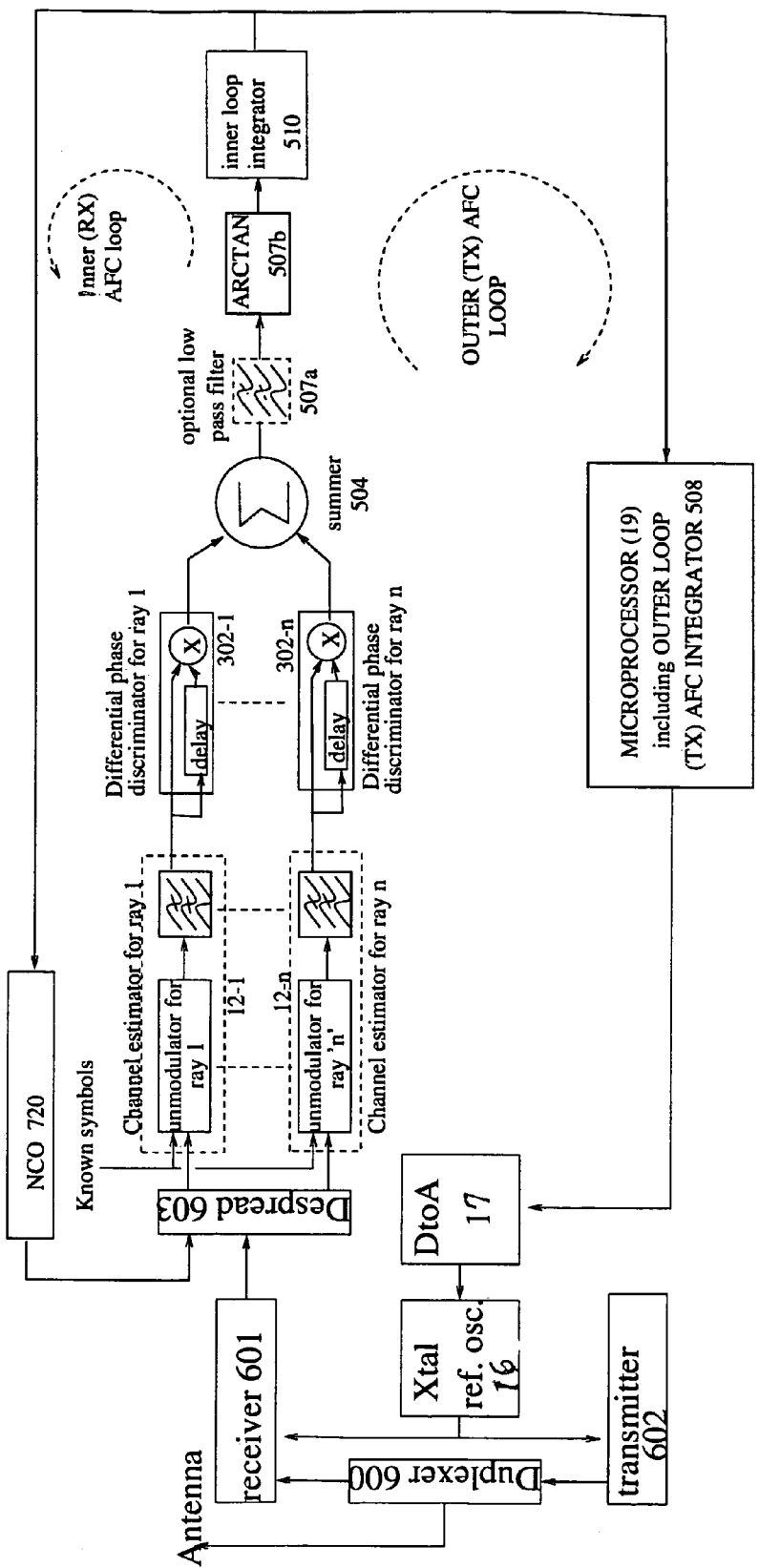
FIG. 12 illustrates an exemplary apparatus for providing a common frequency error estimate using an AFC loop with a common inner AFC loop.

FIG. 12 shows yet another overall AFC loop including an inner AFC loop to adjust the receiver frequency error and an outer AFC loop to correct the transmitter frequency based on the correction developed by the inner loop for the receiver. For brevity, only the differences from FIG. 10 will be highlighted. The inner AFC loop comprises using a numerically controlled oscillator (NCO) 720 that untwists a progressively rotating signal phase, which can be applied by complex multiplying the signal either before or after despreading in a despreader 603 with the NCO's output of $\exp(-jWt)$. The NCO 603 performs the same function as the modulo-$2\pi$ accumulator 501 and cos/sin ROM 502 of FIG. 10. The frequency control value to NCO 720 is developed by inner loop integrator 510 which integrates the combined frequency error estimates from ARCTAN circuit 507b. This inner loop operates until the output of inner loop integrator 510 is equal to the correct mean or relative frequency error between the received signal and the receiver. This frequency error is then applied to the outer loop integrator 508, which may be part of the control microprocessor 19. Differences between the inner loop and the outer loop can be, e.g., that the inner loop operates more rapidly to correct receive frequency error without waiting for the error correction decoder to declare error free data decoding. The outer loop operates more slowly to provide long term correction of crystal oscillator 16 and is preferably protected from operating on erroneous data.

Figure 13:
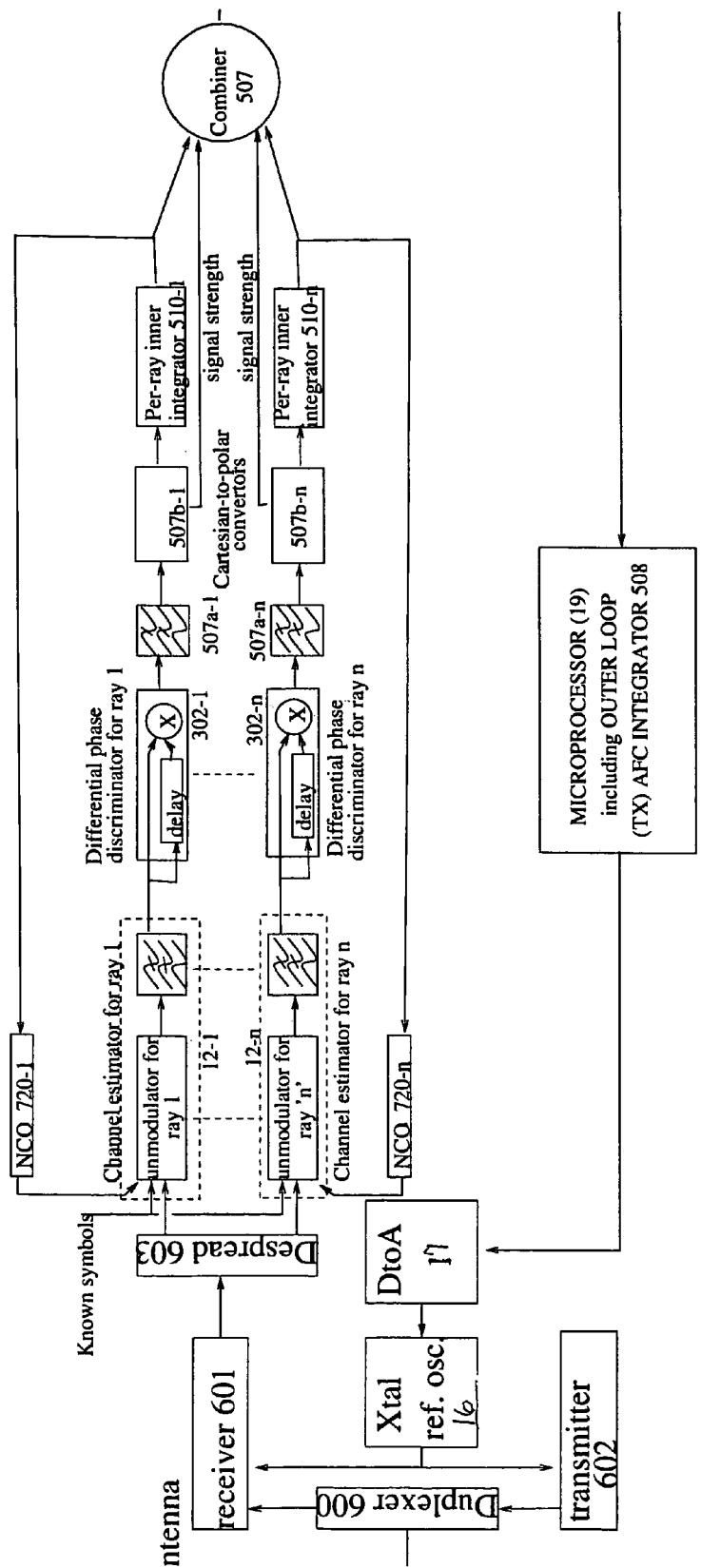
FIG. 13 illustrates an exemplary apparatus for providing a common frequency error estimate using an AFC loop with per-ray inner AFC loops.

FIG. 13 is similar to FIG. 12, except that the inner loops are separate for each multipath ray. In this embodiment, there is one NCO per ray, NCO 720-1, . . . , NCO 720-n. Likewise, there are per-ray inner loop integrators (510-1, . . . , 510-n) and a per-ray ARCTAN circuit, which is now generalized to low pass filter 507a-1, . . . , 507a-n and Cartesian-to-polar converter 507b-1, . . . , 507b-n. The Cartesian-to-polar converter produces both an angle output and a signal strength output. The signal strength output can be related to the amplitude of the differential phase discriminator output, which is in turn related to the power of a ray. The inner loop thus now comprises a collection of n loops, one per significant multipath ray, and the respective loop integrators settle to output mean values related to the mean frequency error of the associated ray. The combiner 507 performs a weighted sum of the inner loop integrator outputs using the amplitude-related output of the associated Cartesian-to-polar convertor as the associated weight. The weighted output is then an estimate of the common or relative frequency error across all rays and is fed to the outer AFC loop integrator 508 included in control processor 19. The sum of the signal strength output of Cartesian-to-polar convertors 507b-1, . . . , 507-n may also be formed by a second summer (not shown) and used for automatic gain control to keep the sum constant at a desired value, for example unity, in which case it is unnecessary to divide the combined output of 507 by the sum of the AFC weights.

Various inventive configurations have been shown above for correcting the reference frequency oscillator of a transmitter-receiver based on frequency estimates made on separate multipath rays, as are usually detected in a receiver for CDMA signals. The various configurations can include a single, common AFC loop to correct the reference oscillator, a separate inner AFC loop to correct received signal frequency error, which correction is then applied to a slower outer loop to correct the reference crystal oscillator, separate inner AFC loops for each multipath ray, the per-ray inner-loop corrections then being optimally combined to form a common correction to the reference oscillator, or both per-ray and a common receiver AFC loop, the common receiver AFC loop then being an outer loop to the per ray loops. An outer loop can be added to further integrate the common receiver AFC loop signal to form a crystal reference oscillator correction loop for the transmitter. The latter configuration represents loops within a loop within a loop, and such configurations are allowed so long as every outer loop is properly designed to tolerate the closed loop poles of the inner loops within it while maintaining desirable stability and damping.

The embodiments described above address how to handle a frequency error between a local frequency reference of a receiver such as an MS and the carrier frequency of a single transmitter, such as a BS. The frequency error problem is aggravated if the receiver receives signals from multiple transmitters at the same time, e.g., if a mobile station is communicating with more than one base station simultaneously, as in a soft handover situation.

According to the WCDMA specification, two base stations are allowed to be frequency misadjusted by ±0.1 ppm which corresponds to ±200 Hz at a carrier frequency of 2 GHz. At the same time, the MS can have frequency inaccuracy from the BS by ±0.1 ppm which also corresponds to ±200 Hz. This is described in more detail in "UTRA (BS) FDD; Radio Transmission and Reception", Technical Specification No. 3G TS 25.104, ver. 3.1.0, 3G Partnership Project (December 1999), which is hereby incorporated here by reference.

Suppose that the MS has a frequency offset equal to 0.1 ppm and is going to camp to new BS which has a frequency offset of −0.1 ppm to the first BS. If the MS combines the received path-rays as described above to estimate the frequency offset, it is possible that the MS may not be able to adjust its local frequency to the new BS and thus may begin transmitting to this BS with a frequency offset that is more than +0.1 ppm. The likelihood of this occurring increases if the number of path-rays received from the new BS is less than that received from the old BS.

Figure 14A:
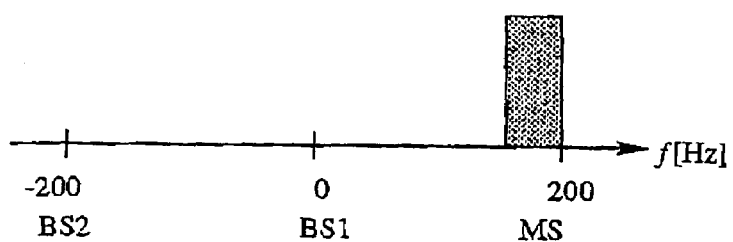
FIGS. 14A-14C illustrate local frequency offsets in a handover scenario.
Figure 14B:
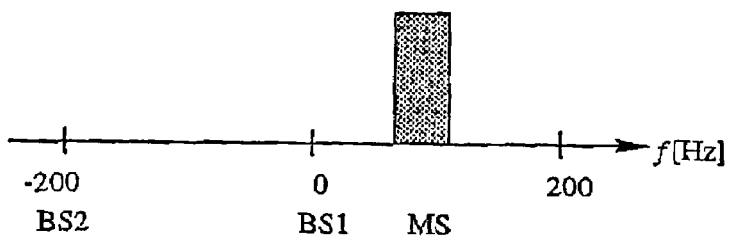
Figure 14C:
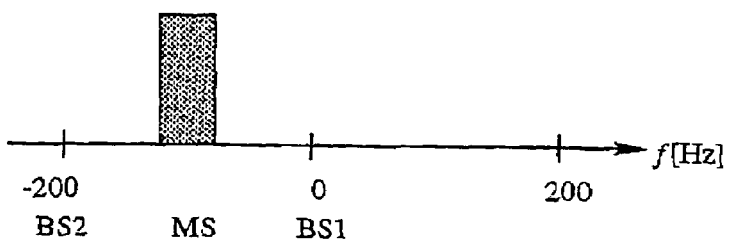

FIGS. 14A-14C illustrate the problem. As shown in FIG. 14A, the MS local frequency can be up to 200 Hz away from the BS1. In soft handover, when a new BS (BS2) with a frequency offset of −200 Hz from B1, starts to communicate with the MS, it has a frequency offset of 400 Hz to the MS. As shown in FIG. 14B, if the MS employs the received path-rays from BS1 and BS2 to estimated the frequency offset, the MS will estimate a frequency offset that is more than 200 Hz from the local frequency of BS2. Hence, the MS should adjust its local frequency to be in between the frequencies of BS1 and BS2, in order to have a frequency offset in between ±200 Hz.

This problem is addressed, according to another aspect of the invention, by handling received path rays from different BSs separately. According to an exemplary embodiment, the received path-rays from different BSs are labeled. The frequency offset is then estimated with respect to both BSs, despite the number of received path-rays from them.

To keep the rays from different base stations separate, the received path rays from different BSs are labeled. The labels identify from which BS the received path-rays are transmitted. For example, in a WCDMA system, Long Codes may be used to identify the base stations from which signals are transmitted. The Long Codes may be applied and detected in any known manner, e.g., as described in U.S. application Ser. No. 09/112,689, filed Jul. 9, 1998, and hereby incorporated here by reference.

The AFC algorithms described above can individually be applied to each BS, and the frequency offset between the MS and the BSs can be determined. A decision can then be made as to what the final frequency offset is by using those estimations so that the MS local frequency is in between the references from BS1 and BS2, as shown in FIG. 14C.

According to this other aspect, the MS can handle multiple BSs by using a separate inner loop AFC for each ray, irrespective of the BS from which the ray originates. Alternatively, in FIG. 15A, received rays are grouped into a first group of rays originating from a first BS and a second group of rays originating from a second BS, based, e.g., on the Long Codes. The exemplary arrangement depicted in FIG. 15A includes a first summer 504-1 for the base station-1 rays, and a second summer 504-2 for the base station-2 rays. Although, in the interest of simplicity, the device shown in FIG. 15A applies to two base stations, it will be appreciated that the invention is not limited to handling signals received from two base stations but may be applicable to signals received from any number of base stations.

Channel estimation, frequency error estimation and combining of frequency error estimates may be performed on the rays, e.g., as described in any of the embodiments above. The combined frequency error estimates in each group of rays are integrated in inner loop AFC integrators 508-1 and 508-2 and used to correct received frequency errors for the respective group of rays. Then the integrated frequency errors for all base stations are combined in summer 517 to produce a relative frequency error estimate. The summed output is then integrated using an outer loop integrator 508 which may be a software AFC integrator. The outer loop integral is then applied to control the crystal oscillator.

The BS-related frequency error integrals may be combined in a number of different ways, with or without weighting. For example, the combining in 517 may be an unweighted average, or each of the combined estimates may be weighted by the received signal strength from the respective BS. Alternatively, the estimate from the BS that exhibits the strongest signal strength may be weighted 1, and the estimates from the BSs that exhibit the weaker signal strengths may be weighted 0. According to another combining method, only the inner loop AFC values associated with rays of the BS to which the mobile is transmitting, as determined by an assigned transmit spreading code, are fed to outer loop integrators. It is also permissible to ignore whether a ray originates from a particular BS and use the previously described combining methods, regardless of where a ray originates.

Figure 15B:
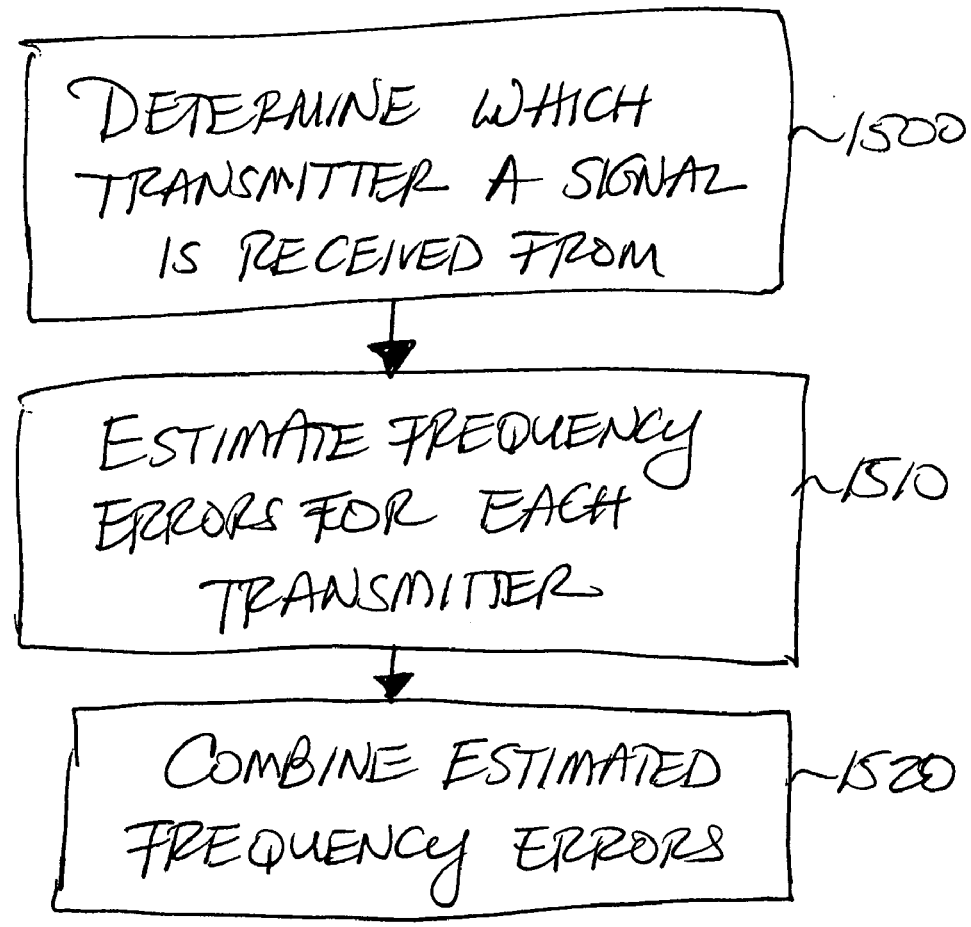

FIG. 15B illustrates a method for estimating a relative frequency offset according to the second aspect. The process begins at step 1500 at which a determination is made which transmitter the received signal is transmitted from, based, e.g., on the Long Codes used for correlation. At step 1510, the frequency errors are estimated separately for each transmitter. At step 1520, the frequency error estimates are combined.

It will be appreciated by those of ordinary skill in the art that this invention can be embodied in other specific forms without departing from its essential character. The embodiments described above should therefore be considered in all respects to be illustrative and not restrictive. For example, although described above with reference to a CDMA communication system, the invention is also applicable in other types of communication systems.

What is claimed is:

1. A transceiver for processing code division multiple access signals received through at least one multipath propagation channel to produce at least one relative frequency error estimate, comprising:

a processor for receiving and processing the signals using a local frequency reference oscillator to obtain representative complex numerical samples for processing;

channel estimators for correlating the complex numerical samples with shifts of a locally generated despreading code and producing a number of complex channel estimates, each corresponding to a different delayed ray of the at least one multipath propagation channel;

frequency error estimators for computing a frequency error estimate for each ray based on successive values of a respective one of the channel estimates; and at least one summer for performing a weighted summation of the frequency error estimates to provide at least one relative frequency error estimate, wherein the relative frequency error estimate is used to control the frequency of a local frequency reference oscillator, and further comprising:

a rake combiner for despreading a desired signal using shifts of a locally generated wanted signal despreading code to produce one complex sample per data symbol per shift and for performing a weighted summation of the complex samples per shift using weighting factors based on the channel estimates to produce a rake-combined value for each data symbol;

a decoder for decoding the per-symbol rake-combined values using a soft error correction decoder to reproduce wanted information bits; and an error detection decoder for performing an error check on the decoded information bits and to generate an error or no-error indication, wherein the relative frequency error estimate is only used to control the local reference oscillator when a no-error indication is generated.

2. The transceiver of claim 1, wherein the local frequency reference is used to control a transmit frequency.

3. A transceiver for processing code division multiple access signals received through at least two multipath propagation channels to produce at least two combined frequency error estimates, comprising:

a processor for receiving and processing the signals using a local frequency reference oscillator to obtain representative complex numerical samples for processing;

channel estimators for correlating the complex numerical samples with shifts of a locally generated despreading code and producing a number of complex channel estimates, each corresponding to a different delayed ray of the at least two multipath propagation channels;

frequency error estimators for computing a frequency error estimate for each ray based on successive values of a respective one of the channel estimates; and at least two summers for performing weighted summations of groups of the frequency error estimates to provide at least two combined frequency error estimates,
wherein:
each of the combined frequency error estimates is a combined frequency error estimate of only those rays associated with a same one of the at least two base station transmitters, the one of the at least two base station transmitters being different for each of the combined frequency error estimates.

4. A method for processing code division multiple access signals received through at least one multipath propagation channel to produce at least one relative frequency error estimate, comprising the steps of:
receiving and processing the signals using the local frequency reference oscillator to obtain representative complex numerical samples for processing;
correlating the complex numerical samples with shifts of a locally generated despreading code and producing a number of complex channel estimates, each corresponding to a different delayed ray of the at least one multipath propagation channel;
computing a frequency error estimate for each ray based on successive values of a respective one of the channel estimates;
performing at least one weighted summation of the frequency error estimates to provide at least one relative frequency error estimate;
using the at least one relative frequency error estimate to control the frequency of a local frequency reference oscillator;
despreading a desired signal with a rake combiner using shifts of a locally generated wanted signal despreading code to produce one complex sample per data symbol per shift and performing a weighted summation of the complex samples per shift using weighting factors based on the channel estimates to produce a rake-combined value for each data symbol;
decoding the per-symbol rake-combined values using a soft error correction decoder to reproduce wanted information bits; and
performing an error check on the decoded information bits and to generate an error or no-error indication, wherein the relative frequency error estimate is only used to control the local reference oscillator when a no-error indication is generated.

5. The method of claim 4, wherein the local frequency reference oscillator is used to control the transceiver to transmit on a desired channel frequency.

6. A method for processing code division multiple access signals received through at least two multipath propagation channels to produce at least two combined frequency error estimates, comprising the steps of:
receiving and processing the signals using the local frequency reference oscillator to obtain representative complex numerical samples for processing;
correlating the complex numerical samples with shifts of a locally generated despreading code and producing a number of complex channel estimates, each corresponding to a different delayed ray of the at least two multipath propagation channels;
computing a frequency error estimate for each ray based on successive values of a respective one of the channel estimates; and
performing at least two weighted summations of groups of the frequency error estimates to provide at least two combined frequency error estimates,
wherein each of the combined frequency error estimates is a combined frequency error estimate of only those rays associated with a same one of the at least two base station transmitters, the one of the at least two base station transmitters being different for each of the combined frequency error estimates.

7. A transceiver for processing code division multiple access signals received through at least one multipath propagation channel to produce at least one relative frequency error estimate, comprising:
a processor for receiving and processing the signals using the local frequency reference oscillator to obtain representative complex numerical samples for processing;
despreaders for different delayed rays of the multipath channel for correlating the numerical samples with different shifts of a locally generated despreading code over symbol intervals to produce streams of complex despread values corresponding to each ray and successive symbol interval;
frequency error correctors for correcting frequency errors on each of the despread value streams by, for each of the despread value streams, progressively rotating the phase angle of successive despread values at a rate given by an associated frequency error integral;
channel estimators for processing the frequency-corrected despread value streams to produce complex channel estimates for each ray;
frequency error estimators for determining a frequency error estimate for each ray by processing successive values of the channel estimates for the corresponding ray; and
at least one combiner for combining the associated frequency error integrals to produce at least one relative frequency error estimate.

8. The transceiver of claim 7, wherein the at least one relative frequency error estimate is used to control the frequency of a local frequency reference.

9. The transceiver of claim 8, further comprising inner loop integrators for integrating respective frequency error estimates to produce integrated frequency errors.

10. The transceiver of claim 9, wherein the at least one combiner adds the frequency error estimates and computes a relative frequency error estimate and integrates the frequency error estimates using an outer loop integrator to produce the control signal.

11. The transceiver of claim 8, wherein the local frequency reference oscillator is used to control a transmit frequency.

12. The transceiver of claim 8, further comprising a rake combiner for despreading a desired signal using shifts of a locally generated wanted signal despreading code to produce one complex sample per data symbol per shift and for performing a weighted summation of the complex samples per shift using weighting factors based on the channel estimates to produce a rake-combined value for each data symbol.

13. The transceiver of claim 12, further comprising a decoder for decoding the per-symbol rake-combined values using a soft error correction decoder to reproduce wanted information bits.

14. The transceiver of claim 13, further comprising an error detection decoder for performing an error check on the decoded information bits and to generate an error or no-error indication, wherein the relative frequency error estimate is only used to control the local reference oscillator when the no-error indication is generated.

15. The transceiver of claim 7, wherein the signals are received from one base station.

16. The transceiver of claim 7, wherein the combiners produce frequency error estimates separately for each base station.

17. A method for processing code division multiple access signals received through at least one multipath propagation channel to produce at least one relative frequency error estimate, comprising the steps of:
- receiving and processing the signals using the local frequency reference oscillator to obtain representative complex numerical samples for processing;
- correlating the numerical samples with different shifts of a locally generated despreading code over symbol intervals to produce streams of complex despread values corresponding to each ray and successive symbol interval;
- correcting frequency errors on each of the despread value streams by, for each of the despread value streams, progressively rotating the phase angle of successive despread values at a rate given by an associated frequency error integral;
- processing the frequency-corrected despread value streams to produce complex channel estimates for each ray;
- determining a frequency error estimate for each ray by processing successive values of the channel estimates for the corresponding ray; and
- combining the associated frequency error integrals to produce at least one relative frequency error estimate.

18. The method of claim 17, further comprising using the at least one relative frequency error estimate to control the frequency of a local reference frequency oscillator.

19. The method of claim 18, further comprising integrating respective frequency error estimates using inner loop integrators to produce integrated frequency errors.

20. The method of claim 18, wherein the step of combining includes adding the frequency error estimates and obtaining a relative frequency error estimate and integrating the relative frequency error estimate using an outer loop integrator to produce the control signal.

21. The method of claim 18, further comprising using the local frequency reference oscillator to control a transmit frequency.

22. The method of claim 18, further comprising despreading a desired signal with a rake combiner using shifts of a locally generated wanted signal despreading code to produce one complex sample per data symbol per shift and performing a weighted summation of the complex samples per shift using weighting factors based on the channel estimates to produce a rake-combined value for each data symbol.

23. The method of claim 22, further comprising decoding the per-symbol rake-combined values using a soft error correction decoder to reproduce wanted information bits.

24. The method of claim 23, further comprising performing an error check on the decoded information bits and to generate an error or no-error indication, wherein the relative frequency estimate is only used to control the local reference oscillator when the no-error indication is generated.

25. The method of claim 17, wherein the signals are received from one base station.

26. The method of claim 17, wherein the frequency error estimates are determined separately for each base station.

27. The transceiver of claim 8, further comprising:
- an inner loop integrator for integrating the frequency error estimate to produce inner loop integral values; and
- an outer loop integrator for integrating the inner loop integral values to produce a control signal to control the local frequency reference oscillator to a value based on the received signal.

28. The transceiver of claim 12, further comprising an error correction and detection decoder for soft-decoding a block of the rake-combined values to provide an error indication for successively recurring block intervals.

29. The transceiver of claim 28, wherein the outer loop integrator integrates the inner loop integral values only for blocks for which the error indication is indicative of no errors, and the inner loop integrator integrates the frequency error estimate only for blocks for which the error indication is indicative of no errors.

30. The transceiver of claim 28, wherein the combiner processes frequency error estimates corresponding to blocks of symbols that have been error correction and detection decoded and which have an associated error indication indicative of no errors.

31. The method of claim 18, further comprising:
- integrating the frequency error estimates using an inner loop integrator to produce inner loop integral values; and
- integrating the inner loop integral values using an outer loop integrator to produce a control signal to control the local frequency reference oscillator to a value based on the received signal.

32. The method of claim 22, further comprising soft-decoding a block of the rake-combined values to provide an error indication for successively recurring block intervals.

33. The method of claim 32, wherein the step of integrating comprises integrating inner loop integral values only for blocks for which the error indication is indicative of no errors, and the step of integrating using an inner loop integrator integrates the frequency error estimates only for blocks for which the error indication is indicative of no errors.

34. The method of claim 32, wherein the step of combining processes frequency error estimates corresponding to blocks of symbols that have been error correction and detection decoded and which have an associated error indication indicative of no errors.

35. A transceiver for processing code division multiple access signals received through at least one multipath propagation channel to produce at least one relative frequency error estimate, comprising:
- a processor for receiving and processing the signals using a local frequency reference oscillator to obtain representative complex numerical samples for processing;
- channel estimators for correlating the complex numerical samples with shifts of a locally generated despreading code and producing a number of complex channel estimates, each corresponding to a different delayed ray of the at least one multipath propagation channel;
- frequency error estimators for computing a frequency error estimate for each ray based on successive values of a respective one of the channel estimates; and
- at least one summer for performing a weighted summation of the frequency error estimates to provide at least one relative frequency error estimate,
- wherein the relative frequency error estimate is used to control the frequency of a local frequency reference oscillator, and
- further comprising an outer loop integrator for integrating the frequency estimates to produce a control signal to control the local frequency reference oscillator to a value based on the received signal,
- wherein the at least one summer adds the real parts of the per-ray frequency error estimates to obtain a real sum and adding the imaginary parts to produce an imaginary sum and computing the two-argument arctangent of the real and imaginary sum.

36. A method for processing code division multiple access signals received through at least one multipath propagation channel to produce at least one relative frequency error estimate, comprising the steps of:
receiving and processing the signals using the local frequency reference oscillator to obtain representative complex numerical samples for processing;
correlating the complex numerical samples with shifts of a locally generated despreading code and producing a number of complex channel estimates, each corresponding to a different delayed ray of the at least one multipath propagation channel;
computing a frequency error estimate for each ray based on successive values of a respective one of the channel estimates;
performing at least one weighted summation of the frequency error estimates to provide at least one relative frequency error estimate;
using the at least one relative frequency error estimate to control the frequency of a local frequency reference oscillator;
integrating the relative frequency error estimate using an outer loop integrator to produce a control signal; and
controlling the frequency of the local frequency reference oscillator using the control signal,
wherein the step of performing at least one weighted summation includes adding the real parts of the per-ray frequency error estimates to obtain a real sum and adding the imaginary parts to produce an imaginary sum and computing the two-argument arctangent of the real and imaginary sum.

37. The transceiver of claim 12, further comprising a rake-combiner for rake-combining and decoding the despread values to decode unknown data symbols.

38. The transceiver of claim 37, wherein the rake-combiner comprises error correction and error detection decoder to produce an associated error indication for the decoded symbols.

39. The transceiver of claim 7, wherein the combiner adds the real parts of the per-ray frequency error estimates to obtain a real sum and adding the imaginary parts to produce an imaginary sum and computing the two-argument arctangent of the real and imaginary sum.

40. The method of claim 17, further comprising rake-combining and decoding the despread values to decode unknown data symbols.

41. The method of claim 40, wherein the decoding comprises error correction and error detection decoding to produce an associated error indication for the decoded symbols.

42. The method of claim 17, wherein the combining step includes adding the real parts of the per-ray frequency error estimates to obtain a real sum and adding the imaginary parts to produce an imaginary sum and computing the two-argument arctangent of the real and imaginary sum.

43. An apparatus for estimating at least two frequency errors between a local frequency reference of a receiver and carrier frequencies of two or more transmitters, comprising:
frequency error estimators for estimating frequency errors separately for different signal paths; and
combiners for combining groups of the frequency error estimates to produce at least two combined frequency error estimates,
wherein:
each of the combined frequency error estimates is a combined frequency error estimate of only those rays associated with a same one of the two or more transmitters, the one of the two or more transmitters being different for each of the combined frequency error estimates.

44. The apparatus of claim 43, further comprising integrating the combined frequency error estimates.

45. A method for estimating at least two frequency errors between a local frequency reference of a receiver and carrier frequencies of two or more transmitters, comprising the steps of:
estimating frequency errors separately for different signal paths; and
combining groups of the frequency error estimates to produce at least two combined frequency error estimates,
wherein each of the combined frequency error estimates is a combined frequency error estimate of only those rays associated with a same one of the two or more transmitters, the one of the two or more transmitters being different for each of the combined frequency error estimates.

46. The method of claim 45, further comprising integrating the combined frequency error estimates.

47. The transceiver of claim 3, wherein at least one of the base station relative frequency error estimates is formed using two or more fingers of a RAKE receiver.

48. The method of claim 6, wherein at least one of the base station frequency error estimates is formed using two or more fingers of a RAKE receiver.

49. The apparatus of claim 43, wherein at least one of the transmitters frequency error estimates is formed using two or more fingers of a RAKE receiver.

50. The method of claim 45, wherein at least one of the transmitter frequency error estimates is formed using two or more fingers of a RAKE receiver.

51. The transceiver of claim 3, comprising:
a combiner for combining the at least two combined frequency error estimates to provide a relative frequency error estimate, wherein the relative frequency error estimate is used to control the frequency of a local frequency reference oscillator.

52. The transceiver of claim 3, wherein the at least two combined frequency error estimates are used to correct frequency error in groups of rays.

* * * * *